United States Patent
Zhang et al.

(10) Patent No.: US 12,125,995 B2
(45) Date of Patent: Oct. 22, 2024

(54) POWER SUPPLY CIRCUIT, CHARGING-DISCHARGING CIRCUIT AND INTELLIGENT TERMINAL

(71) Applicant: GUANGDONG OPPO MOBILE TELECOMMUNICATIONS CORP., LTD., Guangdong (CN)

(72) Inventors: Jialiang Zhang, Guangdong (CN); Hongbin Xie, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 461 days.

(21) Appl. No.: 17/504,472

(22) Filed: Oct. 18, 2021

(65) Prior Publication Data

US 2022/0037706 A1 Feb. 3, 2022

Related U.S. Application Data

(63) Continuation of application No. PCT/CN2019/087285, filed on May 16, 2019.

(51) Int. Cl.
*H02J 7/00* (2006.01)
*H01M 4/133* (2010.01)
(Continued)

(52) U.S. Cl.
CPC .......... *H01M 10/46* (2013.01); *H01M 4/133* (2013.01); *H01M 4/134* (2013.01);
(Continued)

(58) Field of Classification Search
CPC ...... H01M 10/46; H01M 4/133; H01M 4/134; H01M 10/0525; H01M 10/441;
(Continued)

(56) References Cited

U.S. PATENT DOCUMENTS 3,686,530 A * 8/1972 Bogut .................. H02H 3/05
361/57
4,114,082 A * 9/1978 Scheidler .............. H02J 7/0024
320/DIG. 34
(Continued)

FOREIGN PATENT DOCUMENTS

CN 103782443 5/2014
CN 104350662 2/2015
(Continued)

OTHER PUBLICATIONS

The Straight Stuff on Electronic Stability Control Systems (Year: 2011).*
(Continued)

*Primary Examiner* — John T Trischler
(74) *Attorney, Agent, or Firm* — Hodgson Russ LLP

(57) ABSTRACT

A power supply circuit, a charging-discharging circuit and an intelligent terminal are provided. The power supply circuit includes a lithium-ion battery unit having a silicon anode and a lithium-ion battery unit having a carbon anode. The lithium-ion battery unit having the silicon anode is connected in series with the lithium-ion battery unit having the silicon anode, cooperatively supplying power to the to-be-powered unit. A battery system of the intelligent terminal is formed by the lithium-ion battery unit having the silicon anode and the lithium-ion battery unit having the carbon anode and supplies power to the to-be-powered unit. Therefore, constant voltage performance of the lithium-ion battery unit having the carbon anode is utilized effectively, further large capacity and large power margin at low supply voltage of the lithium-ion battery unit having the silicon anode is utilized effectively.

18 Claims, 6 Drawing Sheets

(51) Int. Cl.
*H01M 4/134* (2010.01)
*H01M 10/0525* (2010.01)
*H01M 10/44* (2006.01)
*H01M 10/46* (2006.01)

(52) U.S. Cl.
CPC ..... *H01M 10/0525* (2013.01); *H01M 10/441* (2013.01); *H02J 7/0014* (2013.01); *H02J 7/00047* (2020.01); *H02J 7/0016* (2013.01)

(58) Field of Classification Search
CPC .... H01M 10/48; H02J 7/0014; H02J 7/00047; H02J 7/0016
USPC .......................................... 320/107, 108, 109
See application file for complete search history.

(56) References Cited

U.S. PATENT DOCUMENTS

| | | | | |
|---|---|---|---|---|
| 5,631,534 A * | | 5/1997 | Lewis | H01M 10/482 320/118 |
| 5,990,665 A * | | 11/1999 | Kawata | H02J 7/0068 320/164 |
| 6,377,030 B1 * | | 4/2002 | Asao | H02J 7/0069 320/161 |
| 6,384,607 B2 * | | 5/2002 | Horie | H01M 10/488 324/427 |
| 6,580,249 B2 * | | 6/2003 | Yau | H02J 7/0013 320/122 |
| 7,728,547 B2 * | | 6/2010 | Lim | H02J 7/00304 320/128 |
| 7,786,699 B2 * | | 8/2010 | Demers | H02J 7/00308 320/124 |
| 7,866,425 B2 * | | 1/2011 | King | B60L 50/61 903/951 |
| 8,030,880 B2 * | | 10/2011 | Alston | H02J 7/1423 320/103 |
| 8,222,865 B2 * | | 7/2012 | Lim | H02J 7/0025 320/124 |
| 8,310,203 B2 * | | 11/2012 | Wu | H02J 7/0014 320/118 |
| 8,384,352 B2 * | | 2/2013 | Shiu | H01M 10/44 320/118 |
| 8,765,306 B2 * | | 7/2014 | Amiruddin | H02J 7/0069 429/231.95 |
| 8,796,992 B2 * | | 8/2014 | Wu | H02J 7/00306 320/117 |
| 8,901,888 B1 * | | 12/2014 | Beckman | H01M 10/0431 320/125 |
| 9,013,148 B2 * | | 4/2015 | Wu | H02J 7/0018 320/117 |
| 9,130,377 B2 * | | 9/2015 | Barsukov | H02J 7/0048 |
| 9,136,715 B2 * | | 9/2015 | Wu | H02J 7/00302 |
| 9,142,868 B2 * | | 9/2015 | Sakurai | H02J 7/0047 |
| 9,527,402 B2 * | | 12/2016 | Wyatt | B60L 58/20 |
| 9,676,281 B2 * | | 6/2017 | Song | B60L 3/0046 |
| 9,787,118 B2 * | | 10/2017 | Wortham | H02J 7/342 |
| 9,979,053 B2 * | | 5/2018 | Vu | H01M 10/4207 |
| 9,979,211 B2 * | | 5/2018 | Barsukov | H02J 7/0016 |
| 10,020,485 B2 * | | 7/2018 | Wyatt | B60L 58/20 |
| 10,062,892 B2 * | | 8/2018 | Wyatt | B60L 58/20 |
| 10,110,021 B2 * | | 10/2018 | Hamada | H01M 10/46 |
| 10,112,501 B2 * | | 10/2018 | Ishibashi | B60L 50/52 |
| 10,128,528 B2 * | | 11/2018 | Zhang | H01M 10/06 |
| 10,153,479 B2 * | | 12/2018 | Momo | H01M 10/0404 |
| 10,286,805 B2 * | | 5/2019 | Eun | B60L 58/19 |
| 10,312,553 B2 * | | 6/2019 | Kubota | H01M 10/052 |
| 10,324,133 B2 * | | 6/2019 | Zeng | H02J 7/342 |
| 10,439,192 B2 * | | 10/2019 | Wyatt | B60R 16/033 |
| 10,439,404 B2 * | | 10/2019 | Shen | H02J 7/0019 |
| 10,536,006 B2 * | | 1/2020 | Zhang | H02J 7/0014 |
| 10,541,541 B2 * | | 1/2020 | Zhang | H02J 7/0014 |
| 10,559,963 B2 * | | 2/2020 | Nakao | H01M 10/44 |
| 10,661,679 B2 * | | 5/2020 | Botts | B60L 58/19 |
| 10,727,679 B2 * | | 7/2020 | Zhang | H02J 7/00036 |
| 10,778,014 B2 * | | 9/2020 | Barsukov | H02J 7/0016 |
| 10,814,743 B2 * | | 10/2020 | Li | H01M 10/441 |
| 10,826,303 B2 * | | 11/2020 | Zhang | H02J 7/0019 |
| 10,907,981 B2 * | | 2/2021 | Li | B60L 58/12 |
| 10,916,951 B2 * | | 2/2021 | Zhang | H02J 7/007182 |
| 11,322,949 B2 * | | 5/2022 | Chen | H02J 7/0019 |
| 11,336,102 B2 * | | 5/2022 | Chen | H02J 7/0042 |
| 11,367,910 B2 * | | 6/2022 | Wang | H01M 10/615 |
| 11,394,211 B2 * | | 7/2022 | Chen | H02J 7/02 |
| 11,437,686 B2 * | | 9/2022 | Wyatt | B60L 7/16 |
| 11,476,680 B2 * | | 10/2022 | Chen | H02J 7/0068 |
| 11,581,730 B2 * | | 2/2023 | Yeh | H02J 1/102 |
| 11,652,353 B2 * | | 5/2023 | Chen | H02J 7/00032 320/134 |
| 11,670,947 B2 * | | 6/2023 | Chen | H01M 10/441 320/107 |
| 11,745,619 B2 * | | 9/2023 | Botts | B60L 58/19 318/139 |
| 11,769,914 B2 * | | 9/2023 | Kumeuchi | B60L 53/50 180/2.1 |
| 11,824,392 B2 * | | 11/2023 | Sano | H01M 10/0525 |
| 11,830,999 B2 * | | 11/2023 | Eun | H01M 10/06 |
| 11,837,892 B2 * | | 12/2023 | Chen | H02J 7/0014 |
| 12,034,329 B2 * | | 7/2024 | Zhang | H02J 7/342 |
| 2001/0019794 A1 * | | 9/2001 | Horie | H01M 10/488 429/93 |
| 2003/0042870 A1 * | | 3/2003 | Yau | A61P 29/00 320/117 |
| 2004/0145348 A1 * | | 7/2004 | Bucur | H02J 7/0069 320/128 |
| 2005/0284676 A1 * | | 12/2005 | King | B60W 10/08 180/65.22 |
| 2006/0164038 A1 * | | 7/2006 | Demers | H02J 7/00308 320/116 |
| 2008/0048608 A1 * | | 2/2008 | Lim | H02J 7/00306 320/128 |
| 2009/0107743 A1 * | | 4/2009 | Alston | B60H 1/00428 903/906 |
| 2010/0117592 A1 * | | 5/2010 | Lim | H02J 7/00302 320/101 |
| 2011/0014518 A1 * | | 1/2011 | Nakai | C04B 35/01 429/207 |
| 2011/0156649 A1 * | | 6/2011 | Wu | H02J 7/00308 320/118 |
| 2011/0236751 A1 * | | 9/2011 | Amiruddin | H01M 4/0447 429/188 |
| 2011/0248675 A1 * | | 10/2011 | Shiu | H02J 7/0016 320/118 |
| 2011/0249229 A1 * | | 10/2011 | Kubota | G02F 1/133707 349/141 |
| 2012/0268057 A1 * | | 10/2012 | Wu | H02J 7/0018 320/103 |
| 2013/0021000 A1 * | | 1/2013 | Kuraishi | H02J 7/0016 320/118 |
| 2013/0134942 A1 * | | 5/2013 | Sakurai | H02J 7/0047 320/118 |
| 2013/0244061 A1 * | | 9/2013 | Dhar | B60L 50/30 429/7 |
| 2013/0244063 A1 * | | 9/2013 | Dhar | B60L 50/64 429/149 |
| 2013/0328529 A1 * | | 12/2013 | Zbrozek | H02J 7/0016 320/128 |
| 2014/0077752 A1 * | | 3/2014 | Barsukov | H02J 7/0048 320/103 |
| 2014/0145669 A1 * | | 5/2014 | Wortham | H01M 10/4207 320/103 |
| 2014/0186659 A1 * | | 7/2014 | Dhar | B60L 50/62 429/9 |
| 2014/0265554 A1 * | | 9/2014 | Yang | B60L 3/0046 307/9.1 |
| 2014/0300325 A1 * | | 10/2014 | Wu | H02J 7/00302 320/118 |
| 2014/0306519 A1 * | | 10/2014 | Song | B60L 58/19 320/134 |

(56) References Cited

U.S. PATENT DOCUMENTS

| | | | | |
|---|---|---|---|---|
| 2014/0368158 | A1* | 12/2014 | Vu | H02J 7/00 |
| | | | | 429/9 |
| 2015/0002083 | A1* | 1/2015 | Nakao | H02J 7/0016 |
| | | | | 320/107 |
| 2015/0188188 | A1* | 7/2015 | Zhang | H01M 4/131 |
| | | | | 429/9 |
| 2015/0200551 | A1* | 7/2015 | Wu | H02J 7/00306 |
| | | | | 320/134 |
| 2015/0202984 | A1* | 7/2015 | Wyatt | B60L 7/16 |
| | | | | 320/109 |
| 2015/0326041 | A1* | 11/2015 | Hamada | H02J 7/0019 |
| | | | | 320/103 |
| 2016/0016483 | A1* | 1/2016 | Yasunori | H02J 7/1438 |
| | | | | 320/162 |
| 2016/0059730 | A1* | 3/2016 | Ishibashi | B60L 58/26 |
| | | | | 307/10.1 |
| 2016/0072316 | A1* | 3/2016 | Barsukov | H02J 7/0016 |
| | | | | 320/112 |
| 2016/0111710 | A1* | 4/2016 | Momo | H01M 10/0409 |
| | | | | 204/278 |
| 2017/0162851 | A1* | 6/2017 | Wyatt | B60L 58/20 |
| 2017/0368958 | A1* | 12/2017 | Eun | B60L 50/60 |
| 2018/0138486 | A1* | 5/2018 | Wyatt | H01M 10/0525 |
| 2018/0226810 | A1* | 8/2018 | Barsukov | H02J 7/0048 |
| 2018/0233787 | A1* | 8/2018 | Kubota | H01M 10/44 |
| 2018/0248385 | A1* | 8/2018 | Zhang | H02M 3/01 |
| 2018/0269697 | A1* | 9/2018 | Zhang | H02J 7/00712 |
| 2018/0301912 | A1* | 10/2018 | Shen | H02J 7/0019 |
| 2018/0316203 | A1* | 11/2018 | Zeng | H02J 7/0042 |
| 2018/0358818 | A1* | 12/2018 | Zhang | H02J 7/04 |
| 2018/0366712 | A1* | 12/2018 | Wyatt | H01M 10/06 |
| 2019/0097441 | A1* | 3/2019 | Chen | H02J 7/00302 |
| 2019/0115769 | A1* | 4/2019 | Chen | H02J 7/0024 |
| 2019/0225092 | A1* | 7/2019 | Li | B60L 58/18 |
| 2019/0226859 | A1* | 7/2019 | Li | G01C 21/3697 |
| 2019/0229538 | A1* | 7/2019 | Zhang | H02J 7/00712 |
| 2019/0319321 | A1* | 10/2019 | Wang | H01M 10/0525 |
| 2020/0035978 | A1* | 1/2020 | Wyatt | B60L 7/16 |
| 2020/0106276 | A1* | 4/2020 | Zhang | H02J 7/0019 |
| 2020/0130511 | A1* | 4/2020 | Botts | H01M 4/485 |
| 2020/0203964 | A1* | 6/2020 | Chen | H02J 7/0016 |
| 2020/0247269 | A1* | 8/2020 | Botts | B60L 58/20 |
| 2020/0259342 | A1* | 8/2020 | Chen | H02J 7/00034 |
| 2020/0358297 | A1* | 11/2020 | Sano | H01M 10/48 |
| 2021/0025723 | A1* | 1/2021 | Li | G01C 21/3667 |
| 2021/0111452 | A1* | 4/2021 | Eun | H01M 10/06 |
| 2021/0313812 | A1* | 10/2021 | Chen | H02J 7/0014 |
| 2021/0367278 | A1* | 11/2021 | Zhang | H01M 10/482 |
| 2021/0376618 | A1* | 12/2021 | Chen | H01M 10/441 |
| 2022/0006303 | A1* | 1/2022 | Chen | H01M 10/4257 |
| 2022/0006312 | A1* | 1/2022 | Zhang | H02J 7/0013 |
| 2022/0069362 | A1* | 3/2022 | Kumeuchi | H01M 10/425 |
| 2022/0069610 | A1* | 3/2022 | Zhang | H02M 3/155 |
| 2022/0224126 | A1* | 7/2022 | Chen | H02J 7/007182 |
| 2022/0239116 | A1* | 7/2022 | Chen | H02J 7/0024 |
| 2022/0337056 | A1* | 10/2022 | Yeh | H02J 1/106 |

FOREIGN PATENT DOCUMENTS

| | | | | |
|---|---|---|---|---|
| CN | 109639115 | A * | 4/2019 | H02J 1/102 |
| EP | 2792534 | A1 * | 5/2016 | H01M 10/0404 |
| EP | 3905476 | | 11/2021 | |
| EP | 3937292 | | 1/2022 | |
| EP | 3937333 | | 1/2022 | |
| JP | 2015092444 | | 5/2015 | |
| JP | 2015092444 | A * | 5/2015 | B60L 11/18 |
| JP | 2016081926 | A * | 5/2016 | H01M 10/0404 |
| WO | WO-2012050194 | A1 * | 4/2012 | H01M 10/44 |
| WO | WO-2012142931 | A1 * | 10/2012 | H01M 10/44 |
| WO | 2015108111 | | 7/2015 | |
| WO | WO-2015108111 | A1 * | 7/2015 | B60L 11/18 |

OTHER PUBLICATIONS

CN109639115_Description_Translation (Year: 2019).*
CNIPA, First Office Action for CN Application No. 201980094193.2, Jul. 12, 2023.
EPO, Extended European Search Report for EP Application No. 19928611.3, Apr. 11, 2022.
CNIPA, Second Office Action for CN Application No. 201980094193.2, Dec. 1, 2023.
WIPO, International Search Report for PCT/CN2019/087285, Feb. 6, 2020.

* cited by examiner

POWER SUPPLY CIRCUIT, CHARGING-DISCHARGING CIRCUIT AND INTELLIGENT TERMINAL

CROSS REFERENCE

The present application is a continuation of International Application No. PCT/CN2019/087285, filed May 16, 2019, and the entire disclosure of which is incorporated herein by reference.

TECHNICAL FIELD

The present disclosure relates to the field of intelligent terminals, and in particular to a power supply circuit, a charging-discharging circuit and an intelligent terminal.

BACKGROUND

At present, most of power supply and energy storage devices that are commonly used are configured with lithium-ion batteries. Most of the lithium-ion batteries are configured with graphite anodes. A graphite anode has low manufacturing cost and low embedded lithium potential. However, as intelligent terminals, electric vehicles and the like have more and more powerful functions in recent years, users have improved requirements for using the batteries. For example, the users may perform wireless Internet access, high-speed data transmission, connection with intelligent domestic devices and video transmission through Bluetooth, and the like. Especially with the application of 5G network, battery capacity of the intelligent terminal needs to meet higher requirements.

A conventional graphite anode has a theoretical specific capacity of 372 mAh/g and an embedded lithium voltage of 0.05V. Silicon and lithium can form a multi-phase alloy LixSi, having a theoretical specific capacity of 3600 mAh/g at room temperature, which is much higher than that of the graphite anode, and having the embedded lithium voltage of 0.4V. Therefore, a silicon anode will be a development trend in the future to improve an energy density of lithium-ion batteries at the anode. However, voltage constancy performance of the lithium-ion battery having the silicon anode is relatively poor. Therefore, lithium-ion batteries having the silicon anodes may not be widely applied in the intelligent terminals.

The above information disclosed in the background section is illustrated for understanding the background of the present disclosure, and therefore it may include information that does not constitute prior art known to those of ordinary skill in the art.

SUMMARY OF THE DISCLOSURE

To solve the above technical problem, following technical solutions are provided.

According to a first aspect of the present disclosure, a power supply circuit is provided and includes a power supply battery unit. The power supply battery unit includes a lithium-ion battery unit having a silicon anode and a lithium-ion battery unit having a carbon anode. The lithium-ion battery unit having the carbon anode is connected in series with the lithium-ion battery unit having the silicon anode, and the lithium-ion battery unit having the silicon anode and the lithium-ion battery unit having the carbon anode are configured to cooperatively supply power to a to-be-powered unit.

According to a second aspect of the present disclosure, a charging-discharging circuit is provided and includes: a charging circuit and the above-mentioned power supply circuit. An input end of the charging circuit is connected to a power source, and the charging circuit is electrically connected to the power supply battery unit to charge the power supply battery unit.

According to a third aspect of the present disclosure, an intelligent terminal is provided and includes a to-be-powered unit and the above-mentioned power supply circuit or the above-mentioned charging-discharging circuit. The power supply circuit is electrically connected to to-be-powered unit to supply power for the to-be-powered unit. The charging-discharging circuit is electrically connected to the to-be-powered unit to supply power for the to-be-powered unit.

REFERENCE NUMERALS IN THE ACCOMPANYING DRAWINGS

Figure 1:
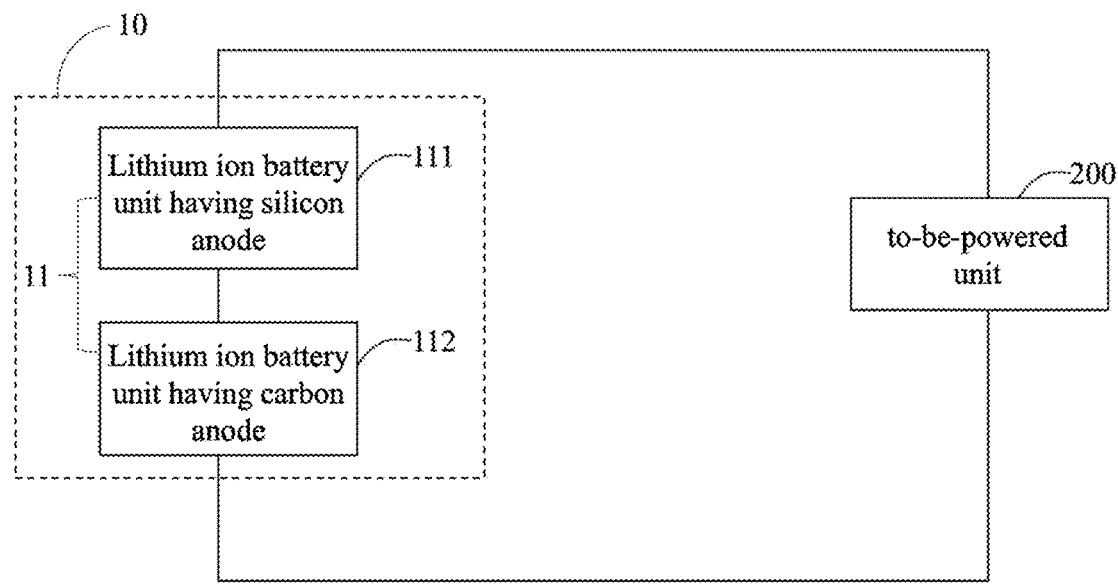
FIG. 1 is a structural diagram of a system of a power supply circuit according to an embodiment of the present disclosure.

100, charging-discharging circuit; 10, power supply circuit; 11, power supply battery unit; 111, lithium-ion battery unit having a silicon anode; 112, lithium-ion battery unit having a carbon anode; 113, voltage conversion circuit.

12, control circuit; 13, first switch circuit; 14, second switch circuit; 15, third switch circuit; 16, fourth switch circuit; 17, fifth switch circuit; 19, voltage detection circuit.

200, to-be-powered unit; 210, first to-be-powered module; 220, second to-be-powered module; 21, direct charging module; 22, voltage conversion module; 23, equalization circuit; 30, adapter.

DETAILED DESCRIPTION

Embodiments will be described more in more details with reference to the accompanying drawings. However, the embodiments can be implemented in a variety of forms and should not be understood as being limited to the examples illustrated herein. Rather, providing the embodiments enables the present disclosure to be more comprehensive and complete and provides ideas of the embodiments to those skilled in the art in a comprehensive manner. The accompanying drawings are only schematic illustrations of the present disclosure and are not necessarily drawn to scale. Identical reference numerals in the drawings indicate identical or similar parts, and therefore, repetitive descriptions will be omitted.

In addition, features, structures, or characteristics described may be combined in any suitable manner in one or more embodiments. In the following description, various specific details are provided so as to provide a full understanding of the embodiments of the present disclosure. However, those of skill in the art shall realize that the technical embodiments of the present disclosure may be implemented by omitting one or more of particular details, or by performing other methods, components, devices, steps, and the like. In other instances, well-known structures, methods, devices, implementations, materials, or operations are not shown or described in detail to avoid obscuring aspects of the present disclosure by overwhelming.

In the present disclosure, unless otherwise expressly specified and limited, terms "inter-connected" and "connected" are to be understood in a broad sense, such as fixed connection, detachable connection, or connection to form an integral structure; or electrical connection or communicative connection; or direct connection, indirect connect through a medium. To a person of ordinary skill in the art, specific meaning of the above terms in the present disclosure may be understood case by case.

In addition, in the description of the present disclosure, "plurality" means at least two, such as two, three, and so on, unless otherwise expressly and specifically limited. Term "and/or" describes a relationship between associated objects and indicates that there can be three relationships. For example, A and/or B indicates A being present alone, B being present alone, and both A and B being present at the same time. A symbol "/" generally indicates an "or" relationship between objects in front of and at back of the symbol. Terms "first" and "second" are used for descriptive purposes only, and are not to be understood as indicating or implying relative importance or implicitly specifying the number of technical features indicated. Therefore, features limited by the "first" and the "second" may explicitly or implicitly include one or more of those features.

The present disclosure provides a power supply circuit, applied in an intelligent terminal and a mobile terminal device. The power supply circuit 10 can take advantages of larger capacity of a lithium-ion battery having a silicon anode. At the same time, a lithium-ion battery having a carbon anode can be omitted, and an impact on a to-be-powered unit caused by poor constant voltage performance of the lithium-ion battery having a carbon anode may be avoided.

The power supply circuit of the present disclosure may be applied in the intelligent terminal device to supply power for the to-be-powered unit in the smart terminal device. The to-be-charged device may be, for example, a terminal or a communication terminal. The terminal or the communication terminal includes, but is not limited to, apparatuses connected via wireline connection, such as a public switched telephone network (PSTN), a digital subscriber line (DSL), a digital cable, direct cable connection, and/or another data connection/network and/or via, for example, a cellular network, a wireless local area network (WLAN), a digital television network such as digital video broadcasting handheld (DVB-H) network, a satellite network, an amplitude frequency modulation (AM-FM), and/or a wireless interface of another communication terminal to receive/send communication signals. The communication terminal configured to communicate via a wireless interface may be referred to as a "wireless communication terminal," a "wireless terminal," and/or a "smart terminal. Examples of smart terminals include, but are not limited to, satellite or cellular telephones; personal communication system (PCS) terminals that can combine cellular radio telephony with data processing, fax, and data communication capabilities. The communication terminal may include a radiotelephone, a pager, Internet/Intranet access, a Web browser, a notepad, and a personal digital assistant having a calendar and/or global positioning system (GPS) receiver. The communication terminal may include a conventional laptop and/or handheld receiver or other electronic device including a radio telephone transceiver. In addition, the terminal may include, but is not limited to, a rechargeable electronic device with charging capabilities such as an e-book reader, a smart wearable device, a mobile power source (e.g., rechargeable battery, travel charger), an electronic cigarette, a wireless mouse, a wireless keyboard, a wireless headset, a Bluetooth speaker, etc. In the following embodiments, a mobile phone will be taken as an example for illustrating the intelligent terminal.

The to-be-powered unit includes, but is not limited to, a processing module of the mobile phone, a keyboard module of the mobile phone, a display module of the mobile phone, a power control module of the mobile phone (controlling a transmitting power), a SMS application module of the mobile phone, an address book application module of the mobile phone, an APP module of the mobile phone, and so on.

According to a first aspect of the present disclosure, a power supply circuit is provided and includes a power supply battery unit. The power supply battery unit includes a lithium-ion battery unit having a silicon anode and a lithium-ion battery unit having a carbon anode. The lithium-ion battery unit having the carbon anode is connected in series with the lithium-ion battery unit having the silicon anode, and the lithium-ion battery unit having the silicon anode and the lithium-ion battery unit having the carbon anode are configured to cooperatively supply power to a to-be-powered unit.

In some embodiments, the lithium-ion battery unit having the silicon anode includes: one lithium-ion battery having a silicon anode or a plurality of lithium-ion battery units having silicon anodes, the plurality of battery units being successively connected in series.

In some embodiments, the lithium-ion battery unit having the carbon anode includes: one lithium-ion battery having a carbon anode; or a plurality of lithium-ion battery units having carbon anodes, the plurality of battery units being successively connected in series.

In some embodiments, the power supply battery unit further includes a voltage conversion circuit. The lithium-ion battery unit having the carbon anode and the lithium-ion battery unit having the silicon anode are connected in series, forming a series battery unit, two ends of the series battery unit are electrically connected to a first end of the voltage conversion circuit and a first end of the to-be-powered unit respectively, a second end of the voltage conversion circuit is electrically connected to a second end of the to-be-powered unit. The voltage conversion circuit is configured for converting voltage of the series battery unit to a voltage required by the to-be-powered unit.

In some embodiments, the power supply circuit further includes a control circuit. The control circuit controls the lithium-ion battery unit having the carbon anode to stop outputting electrical energy when a supply voltage of the lithium-ion battery unit having the carbon anode is less than or equal to a first threshold voltage, and the lithium-ion battery unit having the silicon anode alone is configured to supply power to the to-be-powered unit.

In some embodiments, the power supply circuit further includes a first switch circuit, connected in parallel with the lithium-ion battery unit having the carbon anode. The control circuit is electrically connected to the first switch circuit. The control circuit controls the first switch circuit to be conductive when the supply voltage of the lithium-ion battery unit having the carbon anode is less than or equal to the first threshold voltage, such that the lithium-ion battery unit having the carbon anode stops outputting the electrical energy, and the lithium-ion battery unit having the silicon anode alone is configured to supply power to the to-be-powered unit.

In some embodiments, the to-be-powered unit includes a first to-be-powered module and a second to-be-powered module. The power supply circuit further includes a control circuit. The control circuit controls the lithium-ion battery unit having the carbon anode to stop outputting electrical energy, controls the lithium-ion battery unit having the silicon anode to supply power to the first to-be-powered module alone, and controls the power supply battery unit to stop supplying power to the second to-be-powered module, when a supply voltage of the lithium-ion battery unit having the carbon anode is less than or equal to a first threshold voltage.

In some embodiments, the first to-be-powered module is connected in series with the second to-be-powered module, the lithium-ion battery unit having the silicon anode is connected between the first to-be-powered module and the lithium-ion battery unit having the carbon anode. The power supply circuit further includes a second switch circuit, one end of the second switch circuit is electrically connected to a line between the lithium-ion battery unit having the carbon anode and the lithium-ion battery unit having the silicon anode, and the other end of the second switch circuit is electrically connected to a line between the first to-be-powered module and the second to-be-powered module.

The control circuit controls the second switch circuit to be conductive when the supply voltage of the lithium-ion battery unit having the carbon anode is less than or equal to the first threshold voltage, such that the control circuit controls the lithium-ion battery unit having the carbon anode to stop outputting electrical energy, and the lithium-ion battery unit having the silicon anode alone supplies power to the first to-be-powered module.

In some embodiments, the power supply circuit further includes a fourth switch circuit. The fourth switch circuit is connected in series to a line electrically connected to the to-be-powered unit and the lithium-ion battery unit having the carbon anode. The control circuit is electrically connected to the fourth switch circuit to control the fourth switch circuit to be non-conductive when the second switch circuit is conductive.

In some embodiments, the first to-be-powered module is connected in parallel with the second to-be-powered module, and the power supply circuit further includes a first switch circuit and a third switch circuit. The first switch circuit is connected in parallel with the lithium-ion battery unit having the carbon anode. The third switch circuit is connected in series with the second to-be-powered module. The control circuit controls the first switch circuit to be conductive and controls the third switch circuit to be non-conductive to control the lithium-ion battery unit having the carbon anode to stop outputting electrical energy when the supply voltage of the lithium-ion battery unit having the carbon anode is less than or equal to the first threshold voltage, and the lithium-ion battery unit having the silicon anode alone supplies power to the first to-be-powered module.

In some embodiments, the to-be-powered unit includes a first to-be-powered module and a second to-be-powered module, and the power supply circuit further includes a control circuit. The control circuit controls the lithium-ion battery unit having the carbon anode to stop outputting electrical energy and controls the lithium-ion battery unit having the silicon anode to supply power to the to-be-powered unit alone when a supply voltage of the lithium-ion battery unit having the carbon anode is less than or equal to a first threshold voltage. The control circuit controls the lithium-ion battery unit having the silicon anode to supply power to the first to-be-powered module alone when supply voltage of the lithium-ion battery unit having the silicon anode is less than or equal to a second threshold voltage.

In some embodiments, the first to-be-powered module is connected in series with the second to-be-powered module, the lithium-ion battery unit having the silicon anode is connected between the first to-be-powered module and the lithium-ion battery unit having the carbon anode. The power supply circuit further includes a first switch circuit and a second switch circuit. The first switch circuit is connected in parallel with the lithium-ion battery unit having the carbon anode. One end of the second switch circuit is electrically connected to a line between the lithium-ion battery unit having the carbon anode and the lithium-ion battery unit having the silicon anode, and the other end of the second switch circuit is electrically connected to a line between the first to-be-powered module and the second to-be-powered module. The control circuit controls the first switch circuit to be conductive, and controls the second switch circuit to be non-conductive to control the lithium-ion battery unit having the carbon anode to stop outputting electrical energy when the supply voltage of the lithium-ion battery unit having the carbon anode is less than or equal to the first threshold voltage, and the lithium-ion battery unit having the silicon anode supplies power to the to-be-powered module alone. The control circuit controls the first switch circuit and the second switch circuit to be conductive to control the lithium-ion battery unit having the silicon anode to supply power to the first to-be-powered module alone when the supply voltage of the lithium-ion battery unit having the silicon anode is less than or equal to the second threshold voltage.

In some embodiments, the first to-be-powered module is connected in parallel with the second to-be-powered module. The power supply circuit further includes: a first switch circuit and a third switch circuit. The first switch circuit is connected in parallel with the lithium-ion battery unit having the carbon anode. The third switch circuit is connected in series with the second to-be-powered module. The control circuit controls the first switch circuit and the third switch circuit to be conductive to control the lithium-ion battery unit having the carbon anode to stop outputting electrical energy when the supply voltage of the lithium-ion battery unit having the carbon anode is less than or equal to the first threshold voltage, and the lithium-ion battery unit having the silicon anode supplies power to the to-be-powered unit alone. The control circuit controls the first switch circuit to be conductive and controls the third switch circuit to be non-conductive to control the lithium-ion battery unit having the silicon anode to supply power to the first to-be-powered module alone when the supply voltage of the lithium-ion battery unit having the silicon anode is less than or equal to a third threshold voltage.

In some embodiments, the power supply circuit further includes a fourth switch circuit. The fourth switch circuit is connected in series to a line electrically connected between the to-be-powered unit and the lithium-ion battery unit having the carbon anode. The control circuit is electrically connected to the fourth switch circuit to control the fourth switch circuit to be non-conductive when the first switch circuit is conductive.

In some embodiments, the power supply circuit further includes a control circuit. The control circuit controls the lithium-ion battery unit having the carbon anode and the lithium-ion battery unit having the silicon anode to both stop outputting electrical energy when the supply voltage of the lithium-ion battery unit having the silicon anode is less than or equal to the third threshold voltage.

In some embodiments, the power supply circuit includes at least one voltage detection circuit. The at least one voltage detection circuit is configured to detect the supply voltage of the lithium-ion battery unit having the carbon anode and/or the supply voltage of the lithium-ion battery unit having the silicon anode.

In some embodiments, the power supply circuit includes a battery protection plate, and the voltage detection circuit is arranged on the battery protection plate.

In some embodiments, the power supply circuit includes two battery protection plates. One of the two battery protection plates is electrically connected to the lithium-ion battery unit having the silicon anode, and the other of the two battery protection plates is electrically connected to the lithium-ion battery unit having the carbon anode.

In some embodiments, the power supply circuit includes following components.

A power management chip may be included. The power management chip has an electrical input end, an electrical output end, and a power supply end. The electrical input end is electrically connected to the power supply battery unit to form a power supply circuit with the power supply battery unit. The power supply end is electrically connected to the to-be-powered unit. Electrical energy output from the power supply battery unit flows into the to-be-powered unit through the power management chip. The power management chip is configured to perform power management on the to-be-powered unit.

In some embodiments, the lithium-ion battery unit having the carbon anode is a lithium-ion battery unit having graphite as the anode.

According to a second aspect of the present disclosure, a charging-discharging circuit is provided and includes: a charging circuit and the above-mentioned power supply circuit. An input end of the charging circuit is connected to a power source, and the charging circuit is electrically connected to the power supply battery unit to charge the power supply battery unit.

In some embodiments, the input end of the charging circuit is connected to the power source through an adapter. The charging circuit includes a direct charging module, the direct charging module is configured to take voltage output from the adapter as charging voltage to charge the power supply battery unit.

In some embodiments, the charging circuit further includes a voltage conversion module, the voltage conversion module is configured to increase the voltage output from the adapter to charge the power supply battery unit.

In some embodiments, the charging circuit further includes an equalizing circuit, connected in parallel between a cathode of the lithium-ion battery unit having the silicon anode and an anode of the lithium-ion battery unit having the carbon anode. The equalizing circuit is configured to equalize voltage on the lithium-ion battery unit having the silicon anode and voltage on the lithium-ion battery unit having the carbon anode before or while the charging circuit charges the lithium-ion battery unit having the carbon anode and the lithium-ion battery unit having the silicon anode.

According to a third aspect of the present disclosure, an intelligent terminal is provided and includes a to-be-powered unit and the above-mentioned power supply circuit or the above-mentioned charging-discharging circuit. The power supply circuit is electrically connected to to-be-powered unit to supply power for the to-be-powered unit. The charging-discharging circuit is electrically connected to the to-be-powered unit to supply power for the to-be-powered unit.

As shown in FIG. 1, in the present embodiment, the power supply circuit 10 includes a power supply battery unit 11. The power supply battery unit 11 includes a lithium-ion battery unit 111 having a silicon anode and a lithium-ion battery unit 112 having a carbon anode. The lithium-ion battery unit 111 having the silicon anode and the lithium-ion battery unit 112 having the carbon anode are connected in series and cooperatively supply power for the to-be-powered unit 200. It will be understood that the lithium-ion battery unit 111 having the silicon anode is connected in series with the lithium-ion battery unit 112 having the carbon anode in two manners. A cathode of the lithium-ion battery unit 112 having the carbon anode is connected to the anode of the lithium-ion battery unit 111 having the silicon anode. A cathode of the lithium-ion battery unit 111 having the silicon anode outputs electrical energy (i.e., supplies power) to the to-be-powered unit 200, and the electrical energy returns to the anode of the lithium-ion battery unit 112 having the carbon anode. The cathode of the lithium-ion battery unit 111 having the silicon anode is connected to the anode of the lithium-ion battery unit 112 having the carbon anode. The cathode of the lithium-ion battery unit 112 having the carbon anode outputs electrical energy to the to-be-powered unit 200, and the electrical energy returns to the anode of the lithium-ion battery unit 111 having the silicon anode. In the following embodiments, the series connection in the first manner will be taken as an example for illustration. The skilled person in the art shall be able to apply the series connection in the second manner to the following embodiments.

It is noted herein that the lithium-ion battery having the carbon anode may employ materials such as graphite, hard carbon, soft carbon, carbon nanotubes, and graphene as the anode. In the present embodiment, graphite is employed for the anode of the lithium-ion battery, and the graphite may include artificial graphite, natural graphite, and intermediate phase carbon microspheres.

Figure 2:
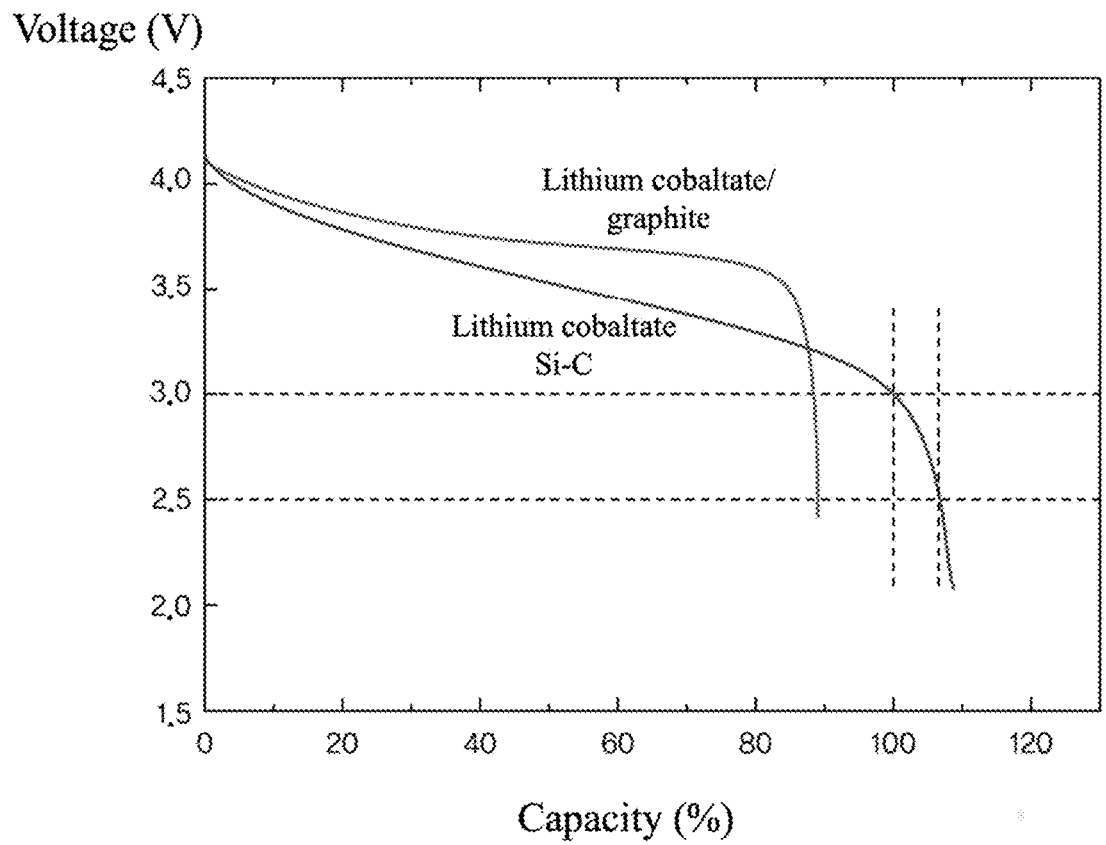
FIG. 2 shows curves of a lithium-ion battery having a silicon anode discharging and a lithium-ion battery having a graphite anode discharging.

As stated in the above, the silicon anode may be a development trend to improve the energy density of the Lithium-ion battery at the anode. However, a discharge curve of silicon anode is different from that of the traditional graphite anode, and therefore, the lithium-ion batteries having the silicon anodes may not be directly applied in the terminals in the art. In the art, the system of the intelligent terminal may set a protection shutdown voltage of 3.4V. A minimum voltage set by a system platform for software operation is generally 3.2V. However, in an application scenario requiring a high current, the voltage may drop significantly to 3.2V or even below 2.8V instantly, affecting normal operation of the software. FIG. 2 compares the discharge curve of the Lithium-ion battery having the silicon anode and the discharge curve of the Lithium-ion battery having the graphite anode. As shown in FIG. 2, when the voltage is below 3.4V, capacity of the graphite anode is significantly small, approximately 5%, whereas when the voltage is below 3.4V, the capacity retained by silicon anode is more than 15%.

In the present disclosure, the lithium-ion battery unit 111 having the silicon anode and the lithium-ion battery unit 112 having the carbon anode are connected in series. Therefore, in a process of supplying power to the to-be-powered unit 200, when the voltage is above 3.4V, a supply voltage of the lithium-ion battery having the carbon anode is maintained between 4.1V and 3.4V. The supply voltage drops slowly, and the constant voltage performance of the lithium-ion battery having the carbon anode is good. After the supply voltage drops to 3.4V, the supply voltage drops significantly, and remaining power of the battery is low. While the lithium-ion battery having the silicon anode is in a discharging process, the voltage drops significantly, and the lithium-ion battery having the silicon anode has relatively poor constant voltage performance. In the present disclosure, the lithium-ion battery unit 111 having the silicon anode and the lithium-ion battery unit 112 having the carbon anode are connected in series. Therefore, a total supply voltage output from the power supply circuit 10 is superimposition of the supply voltage of the lithium-ion battery unit 111 having the silicon anode and the supply voltage of the lithium-ion battery unit 112 having the carbon anode. By superimposing the voltages, the impact caused by the poor constant voltage performance of the lithium-ion battery having the silicon anode may be reduced, and at the same time, the lithium-ion battery having the silicon anode still has a large power margin at the low voltage.

In detail, when the supply voltage of the lithium-ion battery having the silicon anode is below 3.4V, the lithium-ion battery having the silicon anode may still release relatively large power. Therefore, by configuring appropriate supply voltage values of the lithium-ion battery unit 112 having the carbon anode and the lithium-ion battery unit 111 having the silicon anode, duration of power supply may be extended. For example, when the supply voltage of the lithium-ion battery having the silicon anode is lower than 3.4V, the supply voltage of the lithium-ion battery having the carbon anode is still higher than 3.4V. Therefore, both the lithium-ion battery having the carbon anode and the lithium-ion battery having the silicon anode can output electrical energy. The supply voltages of the two battery units are superimposed to obtain the total supply voltage, and the total supply voltage still meets power supply requirements for the to-be-powered unit 200. Therefore, according to the present disclosure, a utilization rate of the electric energy of the lithium-ion battery unit 111 having the silicon anode is improved effectively, and duration of power supply is extended. Therefore, endurance of the intelligent terminal is improved.

In the present embodiment, the lithium-ion battery unit 111 having the silicon anode includes one lithium-ion battery having the silicon anode or a plurality of lithium-ion batteries having the silicon anodes that are connected in series successively. The lithium-ion battery unit 112 having the carbon anode includes one lithium-ion battery having the carbon anode or a plurality of lithium-ion batteries having the carbon anodes that are connected in series successively. Obviously, two ends of the lithium-ion battery unit 112 having the carbon anode are a cathode and an anode of the lithium-ion battery unit 112 having the carbon anode, and two ends of the lithium-ion battery unit 111 having the silicon anode are a cathode and an anode of the lithium-ion battery unit 111 having the silicon anode. In the present embodiment, a plurality of lithium-ion batteries having the carbon anodes, or a plurality of the lithium-ion batteries having the silicon anodes may be configured in combination based on the supply voltage for the to-be-powered unit 200 and power supply requirements for the to-be-powered unit 200, such that constant voltage performance of the total supply voltage meet the requirements for the to-be-powered unit 200. At the same time, in the present embodiment, electric energy of the lithium-ion battery having the silicon anode may be used as much as possible when the supply voltage of the battery is at 3.4V, such that the utilization rate of the electric energy of the lithium-ion battery having the silicon anode may be improved.

Figure 3:
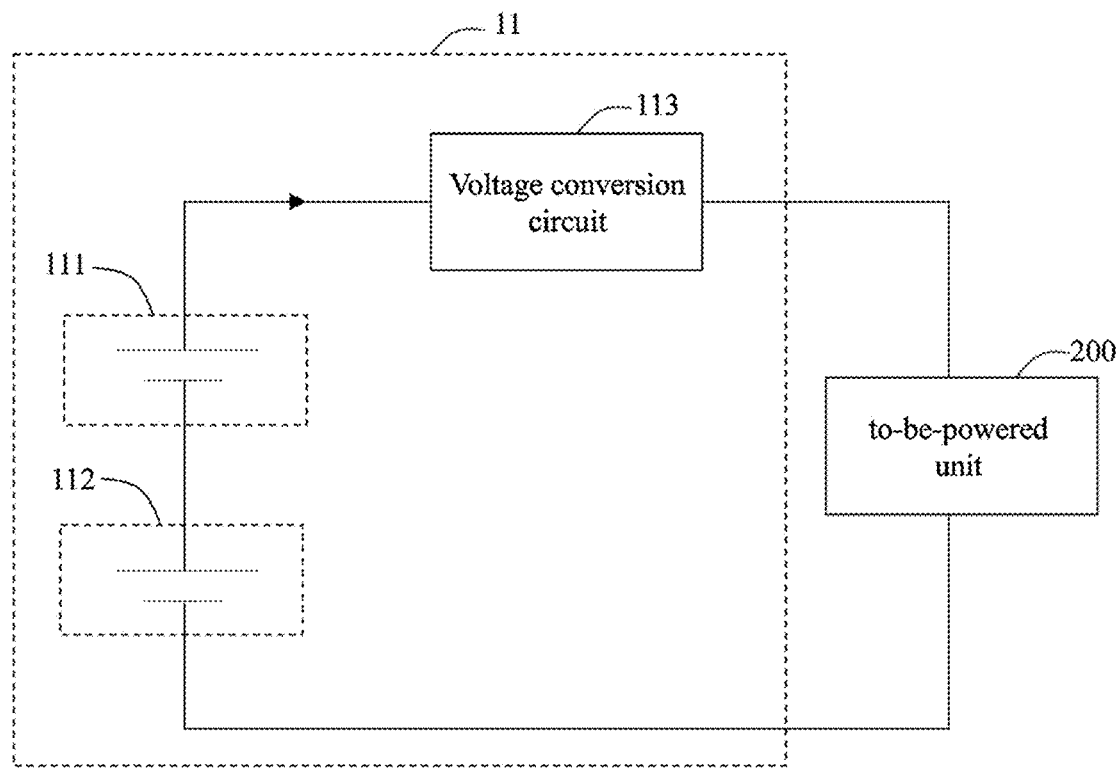
FIG. 3 is a structural diagram of a system of a power supply circuit having a voltage conversion circuit according to an embodiment of the present disclosure.

As shown in FIG. 3, in some embodiments, the power supply battery unit 11 may further include a voltage conversion circuit 113. After the lithium-ion battery unit 111 having the silicon anode and the lithium-ion battery unit 112 having the carbon anode are connected in series, a series battery unit is formed, and two ends of the series battery unit are electrically connected to a first end of the voltage conversion circuit 113 and a first end of the to-be-powered unit 200. A second end of the voltage conversion circuit 113 is electrically connected to a second end of the to-be-powered unit 200. After the lithium-ion battery unit 111 having the silicon anode and the lithium-ion battery unit 112 having the carbon anode are connected in series to form the series battery unit, the voltage conversion circuit 113 is configured to convert a voltage of the series battery unit into a voltage required by the to-be-powered unit 200.

In detail, the first end and the second end of the voltage conversion circuit 113 may be interpreted as an input end and an output end, respectively. The first end and the second end of the to-be-powered unit 200 may be interpreted as an electrical input end and an electrical output end. Specific correspondence may be determined according to an actual circuit.

Based on the supply voltage and/or supply current required by the to-be-powered unit 200, the voltage conversion circuit 113 may be a boost circuit or a voltage reducing circuit. In detail, the boost circuit or the voltage reducing circuit may take the BOOST and BUCK circuits available in the art. Alternatively, a voltage conversion chip may be configured to match a total output voltage and a total current of a total battery pack (including the lithium-ion battery unit 111 having the silicon anode and the lithium-ion battery unit 112 having the carbon anode, same hereinafter) with the charging voltage and the charging current required by to-be-charged unit.

In some embodiments, the voltage conversion circuit 113 may be a voltage reducing capacitor. The total battery pack may charge the voltage reducing capacitor, such that the voltage reducing capacitor supplies power to the to-be-powered unit 200 at a capacitive voltage. Alternatively, the supply voltage of the lithium-ion battery unit 111 having the silicon anode may be substantially equal to the supply voltage of the lithium-ion battery unit 112 having the carbon anode. The voltage reducing capacitor reduces the total voltage output from the total battery pack by ½ to supply power to the to-be-powered unit 200.

In the present embodiment, the power supply circuit 10 includes a control circuit 12. The control circuit 12 may be implemented by taking an independent MCU or may be a master control chip of the intelligent terminal. The control circuit 12 may be electrically connected to the voltage conversion circuit 113 to control operation of the voltage conversion circuit 113.

Figure 9:
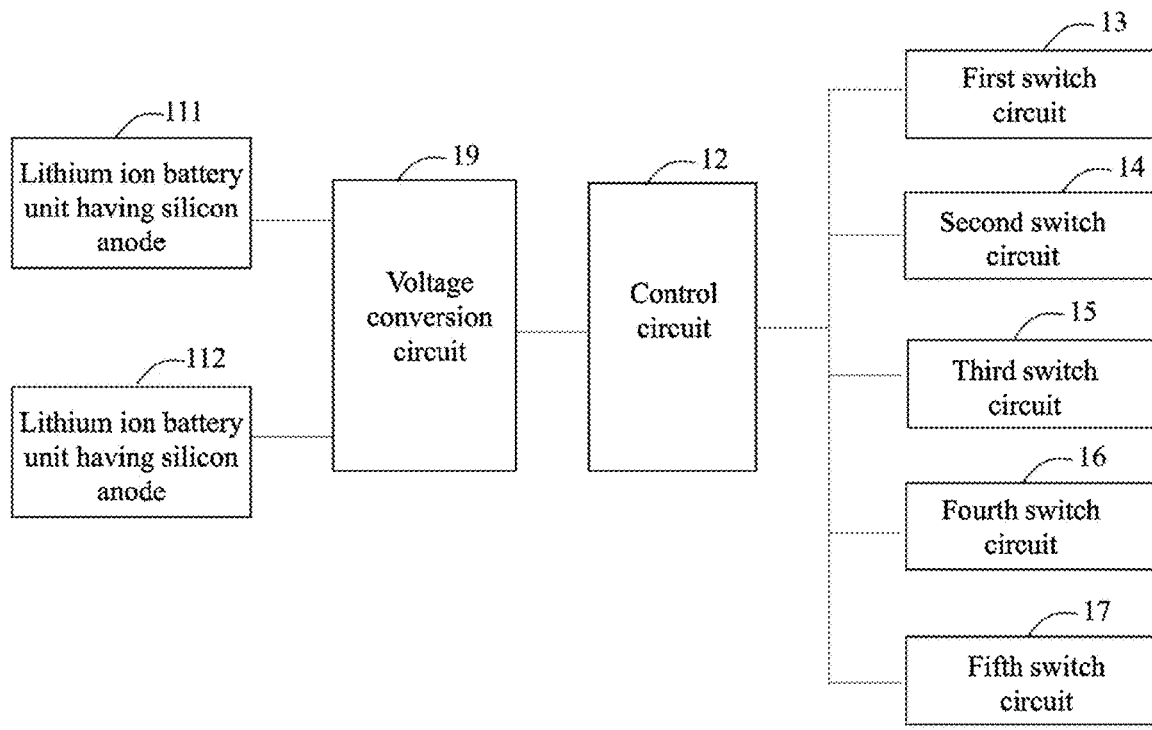
FIG. 9 is a diagram of a control structure of a power supply circuit according to an embodiment of the present disclosure.
Figure 10:
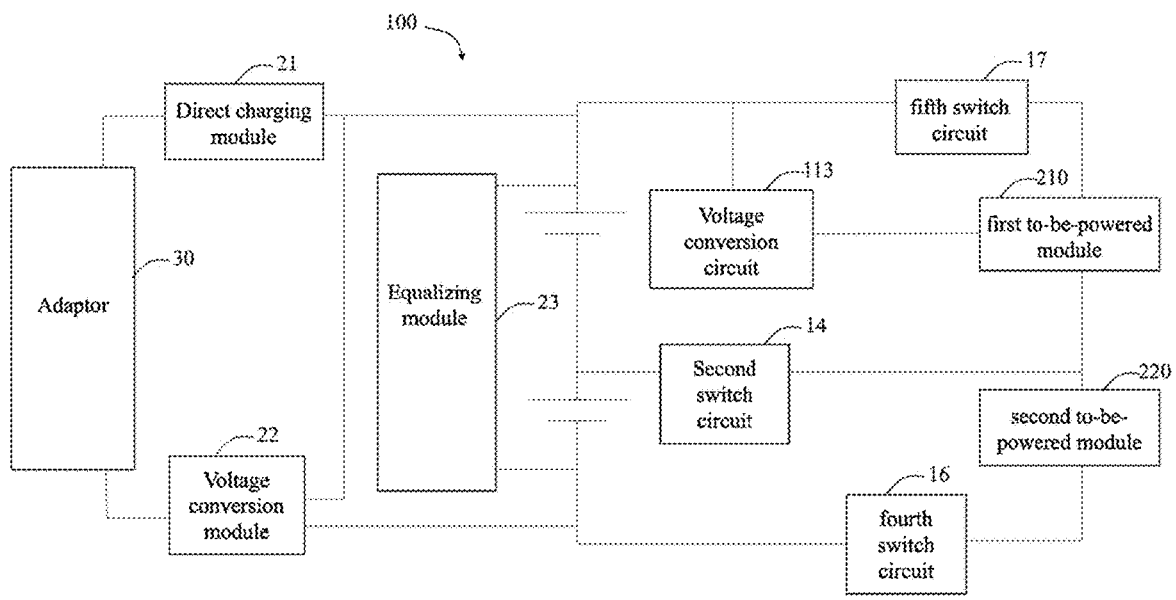
FIG. 10 is a structural diagram of a system of a charging-discharging circuit according to an embodiment of the present disclosure.
Figure 11:
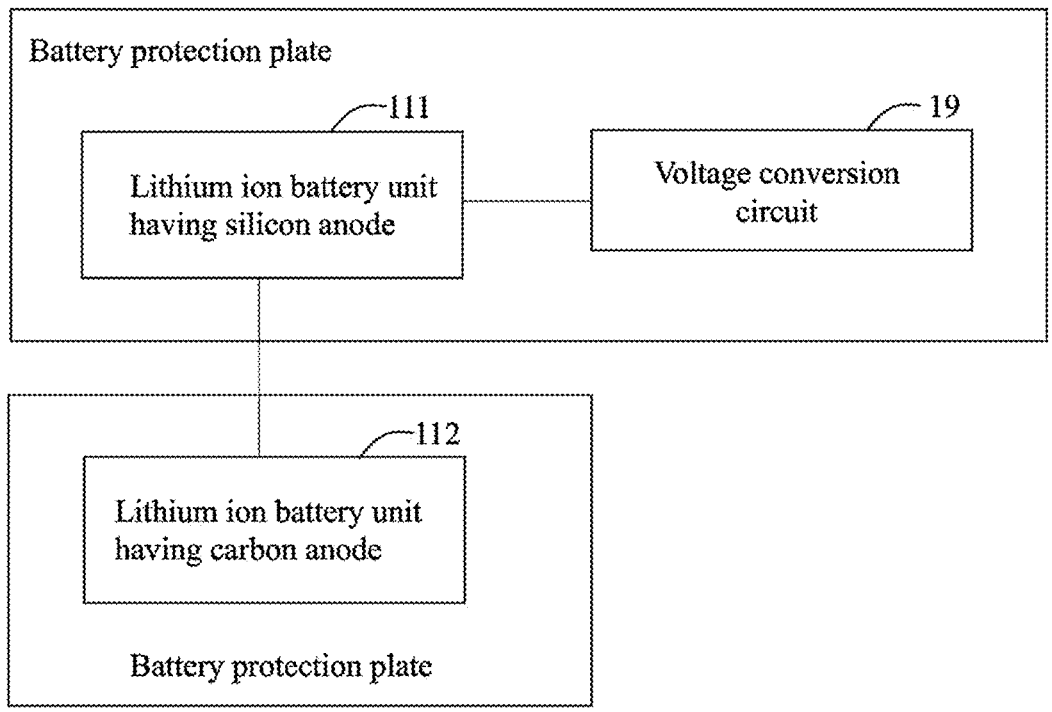
FIG. 11 is a structural diagram of the power supply battery unit and the voltage conversion unit arranged on the battery protection plate according to an embodiment of the present disclosure.
Figure 12:
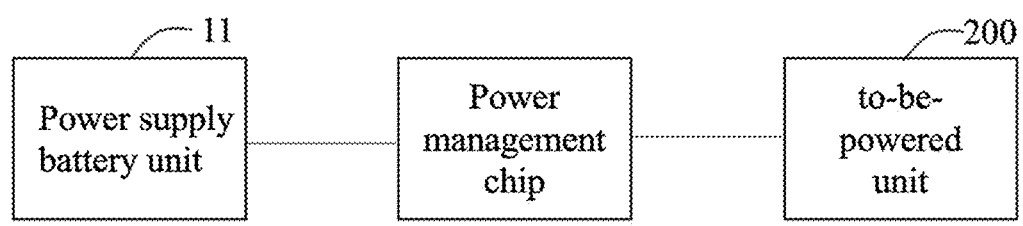
FIG. 12 is a structural diagram of the power management chip being connected to the power supply battery unit and the to-be-powered unit according to an embodiment of the present disclosure.

The control circuit 12 herein has a voltage detection function to detect the supply voltage of the lithium-ion battery unit 112 having the carbon anode and the supply voltage of the lithium-ion battery unit 111 having the silicon anode. In another embodiment, as shown in FIG. 9, the power supply circuit 10 includes at least one voltage detection circuit 19. The voltage detection circuit 19 is configured to detect the supply voltage of the lithium-ion battery unit 111 having the silicon anode or the supply voltage of the lithium-ion battery unit 112 having the carbon anode. In detail, the power supply circuit 10 also includes a battery protection plate. A battery protection circuit may be arranged on the battery protection plate. The voltage detection circuit 19 is disposed on the battery protection plate. Two battery protection plates may be arranged. One of the two battery protection plates may be electrically connected to the lithium-ion battery unit 111 having the silicon anode, and the other of the two battery protection plates may be electrically connected to the lithium-ion battery unit 112 having the carbon anode.

Power supply modes of the lithium-ion battery unit 111 having the silicon anode and the lithium-ion battery unit 112 having the carbon anode will be described in the following. Three threshold voltages are mentioned in the following embodiments. A first threshold voltage is a lower limit of the supply voltage of the battery unit having the carbon anode. A third threshold voltage is a lower limit of the supply voltage of the series battery unit. A second threshold voltage corresponds to a threshold voltage when a to-be-powered object of the battery unit having the silicon anode is switched. More details will be illustrated in the embodiments.

Figure 4:
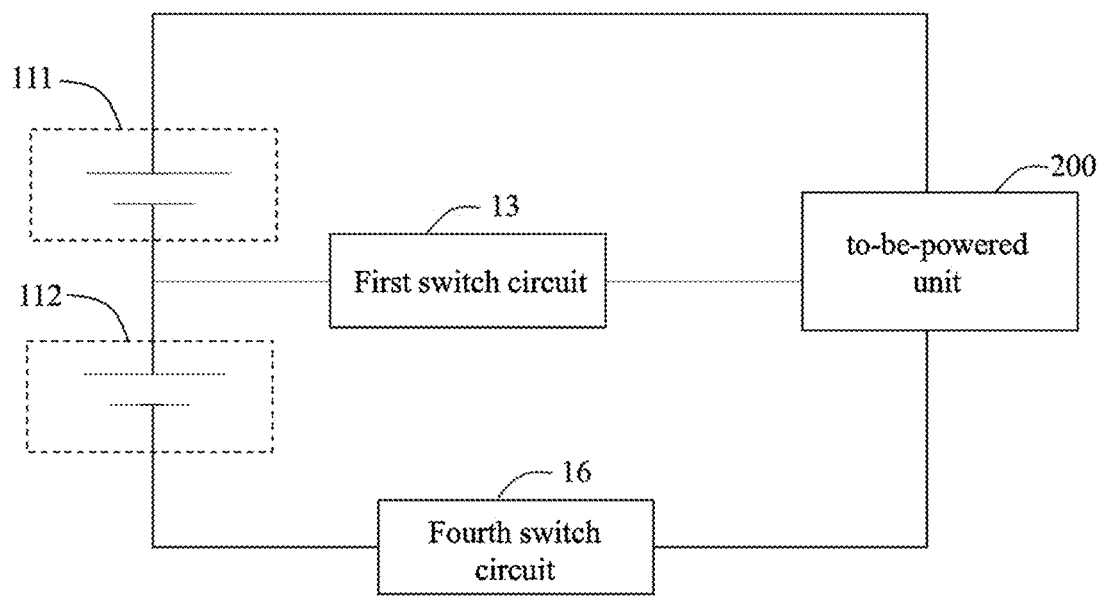
FIG. 4 is a structural diagram of a system of a power supply circuit according to an embodiment of the present disclosure.

As shown in FIG. 4, in a first embodiment, the control circuit 12 controls the lithium-ion battery unit 112 having the carbon anode to stop outputting the electrical energy when the supply voltage of the lithium-ion battery unit 112 having the carbon anode is less than or equal to the first threshold voltage, and the lithium-ion battery unit 111 having the silicon anode alone supplies power to the to-be-powered unit 200. The first threshold voltage, such as 3.4V, may be the lower limit voltage for the lithium-ion battery having the carbon anode to operate.

In detail, the power supply circuit 10 also includes a first switch circuit 13. The first switch circuit 13 is connected in parallel with the lithium-ion battery unit 112 having the carbon anode. The control circuit 12 controls the first switch circuit 13 to be conductive when the supply voltage of the lithium-ion battery unit 112 having the carbon anode is less than or equal to the first threshold voltage to cause a short circuit for the lithium-ion battery having the carbon anode, such that the lithium-ion battery having the carbon anode stops outputting the electrical energy. The lithium-ion battery unit 111 having the silicon anode alone supplies power to the to-be-powered unit 200. According to the present implementation, the lithium-ion battery unit 112 having the carbon anode is isolated from the power supply circuit when the voltage of the lithium-ion battery having the carbon anode is excessively low to supply power, such that the lithium-ion battery having the silicon anode continues to supply power to the to-be-powered unit 200.

The first switch circuit 13 may be a switch tube (such as a MOS tube, a CMOS tube, a triode, and the like). The triode will be taken as an example for illustration hereinafter. A base set of the triode is electrically connected to the control circuit 12. An emission set and a collector of the triode are connected in parallel to two ends of the lithium-ion battery unit 112 having the carbon anode.

It should be noted that, when the supply voltage of the lithium-ion battery unit 112 having the carbon anode is not sufficient to supply power directly to the to-be-powered unit 200, a boost circuit may be configured to increase the supply voltage to meet the power supply requirements of the to-be-powered unit 200.

Figure 5:
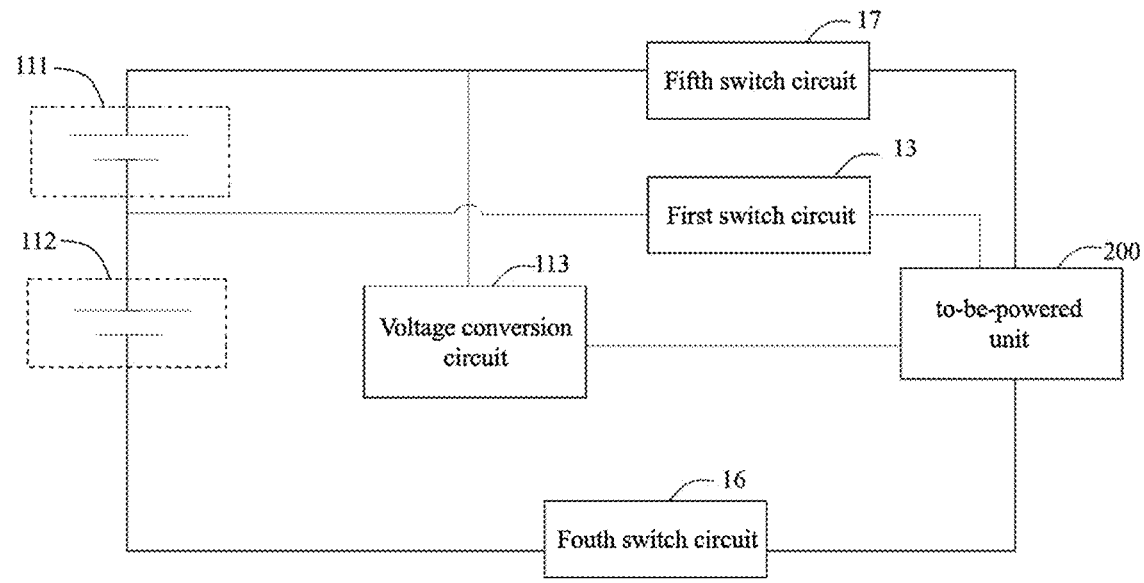
FIG. 5 is a structural diagram of a system of the power supply circuit having a voltage conversion circuit corresponding to FIG. 4.

As shown in FIG. 5, in a second embodiment, the power supply circuit 10 has the voltage conversion circuit 113. When the supply voltage of the lithium-ion battery unit 112 having the carbon anode is less than or equal to the first threshold voltage, the control circuit 12 controls the lithium-ion battery unit 112 having the carbon anode to stop outputting the electrical energy. In this case, as the lithium-ion battery unit 111 having the silicon anode alone supplies power to the to-be-powered unit 200, the voltage conversion circuit 113 is no longer needed, and the supply voltage of the lithium-ion battery having the silicon anode supplies power for the to-be-powered unit 200.

In this case, the power supply circuit 10 includes the first switch circuit 13 and a fifth switch circuit 17. The first switch circuit 13 is connected in parallel with the lithium-ion battery unit 112 having the carbon anode. An end of the fifth switch circuit 17 is electrically connected to the first end of the voltage conversion circuit 113. The other end of the fifth switch circuit 17 is electrically connected to the second end of the to-be-powered unit 200. The control circuit 12 is electrically connected to the first switch circuit 13 and the fifth switch circuit 17. The control circuit 12 controls the first switch circuit 13 and the fifth switch circuit 17 to be conductive when the supply voltage of the lithium-ion battery unit 112 having the carbon anode is less than or equal to the first threshold voltage, such that the lithium-ion battery having the carbon anode stops outputting the electrical energy, and the lithium-ion battery unit 111 having the silicon anode directly supplies power to the to-be-powered unit 200.

In more detail, the cathode of the lithium-ion battery unit 112 having the carbon anode is connected to the anode of the lithium-ion battery unit 111 having the silicon anode, the cathode of the lithium-ion battery unit 111 having the silicon anode is connected to the input end of the voltage conversion circuit 113, the output end of the voltage conversion circuit 113 is electrically connected to an electrical input end of the to-be-powered unit 200, and an electrical output end of the to-be-powered unit 200 is electrically connected to the anode of the lithium-ion battery having the silicon anode. One end of the first switch circuit 13 is connected to the electrical output end of the to-be-powered unit 200, and the other end of the first switch circuit 13 is connected to the anode of the lithium-ion battery unit 111 having the silicon anode. One end of the fifth switch circuit 17 is connected to the input end of the voltage conversion circuit 113, and the other end is connected to the electrical input end of the to-be-powered unit 200.

Further, the power supply circuit 10 may further include a fourth switch circuit 16. The fourth switch circuit 16 is connected in series to the electrical output end of the to-be-powered unit 200 and the circuit that is electrically connected to the anode of the lithium-ion battery unit 112 having the carbon anode. The control circuit 12 is electrically connected to the fourth switch circuit 16 to control the fourth switch circuit 16 to be conductive or non-conductive. When the first switch circuit 13 and the fifth switch circuit 17 are turned on, the fourth switch circuit 16 is turned off. Circuits shown in the following embodiments all may have the fourth switch circuit 16. Therefore, the fourth switch circuit 16 will not be repeatedly described.

In the present disclosure, the to-be-powered unit 200 includes a first to-be-powered module 210 and a second to-be-powered module 220 which are electrically connected with each other. The first to-be-powered module 210 includes some components having low power supply demand, for example, the circuit is in a standby mode, the first to-be-powered module 210 has a short message module, and an ordinary application is running normally, and the like. The second to-be-powered module 220 includes some components having high power supply demand, such as a gaming application, a flashlight module, an audio playing module, and the like. It should be noted that, the first to-be-powered module 210 and the second to-be-powered module 220 are not limited to the manner mentioned in the present embodiment, but may supply power for specific functional modules based on a preset operating mode of the intelligent terminal device. For example, the intelligent terminal device may have a normal mode and a power saving mode. When the intelligent terminal device is in the normal mode, power is supplied to almost all to-be-powered modules in the system. When the intelligent terminal device is in the power saving mode, power is supplied to only some predetermined to-be-powered modules of all the to-be-powered modules in the system, alternatively, power supply demand is adjusted for certain to-be-powered modules. For example, a supply voltage for the backlight module is adjusted from 3.4V to 3V.

In the third embodiment, when the supply voltage of the lithium-ion battery unit 112 having the carbon anode is less than or equal to the first threshold voltage, the control circuit 12 controls the lithium-ion battery unit 112 having the carbon anode to stop outputting the electrical energy, controls the lithium-ion battery having the silicon anode alone to supply power to the first to-be-powered module 210, and controls the supply battery unit 11 to stop supplying power to the second to-be-powered module 220. In an example, the first threshold voltage is 3.4V. When the lithium-ion battery unit 112 having the carbon anode is less than or equal to 3.4V, the lithium-ion battery unit 111 having the silicon anode is controlled to supply power to the first to-be-powered module 210, and the lithium-ion battery unit 112 having the carbon anode is controlled to stop outputting voltage.

Since the lithium-ion battery unit 112 having the carbon anode stops outputting the electrical energy, the total supply voltage of the battery pack decreases. In order to extend the endurance of the intelligent terminal device and ensure that the user may still use of some basic functions in an emergent situation, in the present embodiment, the first to-be-powered module 210 is powered by the lithium-ion battery having the silicon anode alone when the lithium-ion battery unit 112 having the carbon anode is unable to supply power.

In detail, the first to-be-powered supply module is connected in series with the second to-be-powered module, and the lithium-ion battery having the silicon anode is connected between the first to-be-powered module and the lithium-ion battery unit having the carbon anode. The power supply circuit 10 includes the second switch circuit 14 and the control circuit 12. One end of the second switch circuit 14 is electrically connected to a connection line of the lithium-ion battery unit 112 having the carbon anode and the lithium-ion battery unit 111 having the silicon anode. The other end of the second switch circuit 14 is electrically connected to the first to-be-powered module 210. The control circuit 12 and the second switch circuit 14 are both electrically connected. The control circuit 12 controls the second switch circuit 14 to be conductive when the supply voltage of the lithium-ion battery unit 112 having the carbon anode is less than or equal to the first threshold voltage, such that the lithium-ion battery having the carbon anode stops outputting the electrical energy, and the lithium-ion battery unit 111 having the silicon anode alone supplies power to the to-be-powered unit 200.

Figure 6:
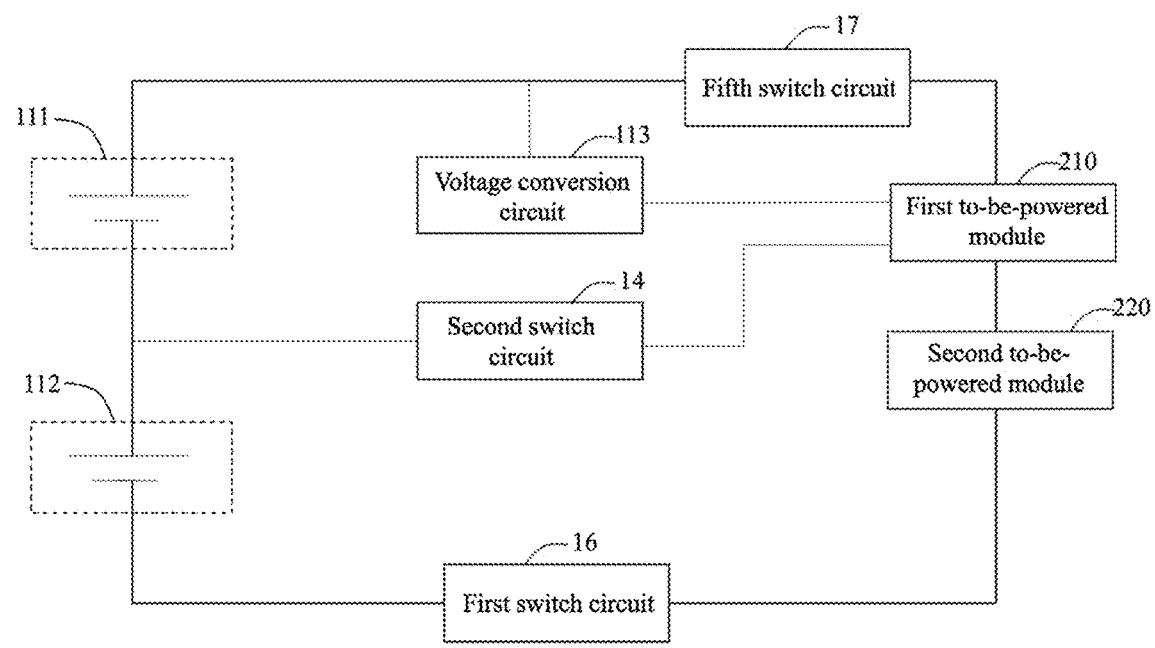
FIG. 6 is a structural diagram of a system of a power supply circuit having a voltage conversion circuit according to another embodiment of the present disclosure.

As shown in FIG. 6, in the third embodiment, the power supply circuit 10 includes the voltage conversion circuit 113. When the supply voltage of the lithium-ion battery unit 112 having the carbon anode is less than or equal to the first threshold voltage, the control circuit 12 controls the lithium-ion battery unit 112 having the carbon anode to stop outputting the electrical energy. In this case, since the lithium-ion battery unit 111 having the silicon anode alone supplies power to the first to-be-powered module 210, the voltage conversion circuit 113 is no longer needed, and the supply voltage of the lithium-ion battery having the silicon anode supplies power to the to-be-powered unit 200.

In detail, the power supply circuit 10 includes the fifth switch circuit 17, the second switch circuit 14, and the control circuit 12. One end of the fifth switch circuit 17 is electrically connected to the first end of the voltage conversion circuit 113. The other end of the fifth switch circuit 17 is electrically connected to the first to-be-powered module 210. One end of the second switch circuit 14 is electrically connected to the connection line between the lithium-ion battery unit 112 having the carbon anode and the lithium-ion battery unit 111 having the silicon anode. The other end of the second switch circuit 14 is electrically connected to the first to-be-powered module 210. The control circuit 12 is electrically connected to the fifth switch circuit 17 and the second switch circuit 14. The control circuit 12 controls the fifth switch circuit 17 and the second switch circuit 14 to be conductive when the supply voltage of the lithium-ion battery unit 112 having the carbon anode is less than or equal to the first threshold voltage, such that the lithium-ion battery having the carbon anode stops outputting the electrical energy, and the lithium-ion battery unit 111 having the silicon anode directly supplies power to the to-be-powered unit 200.

Figure 7:
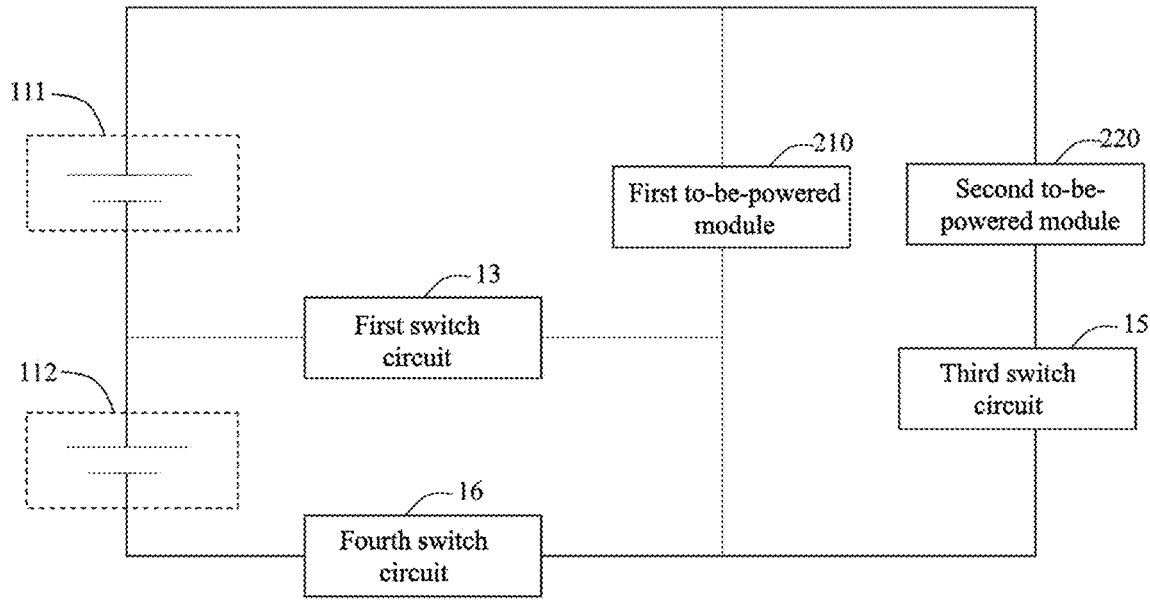
FIG. 7 is a structural diagram of a system of a power supply circuit according to an embodiment of the present disclosure.

As shown in FIG. 7, in a fourth embodiment, the first to-be-powered module is connected in parallel with the second to-be-powered module. The power supply circuit 10 further includes the first switch circuit 13 and the third switch circuit 15. The first switch circuit 13 is connected in parallel with the lithium-ion battery unit 112 having the carbon anode. The third switch circuit 15 is connected in series with the second to-be-powered module 220. The control circuit 12 controls the first switch circuit 13 to be conductive and controls the third switch circuit 15 to be non-conductive when the supply voltage of the lithium-ion battery unit 112 having the carbon anode is less than or equal to the first threshold voltage, such that the lithium-ion battery unit 112 having the carbon anode is controlled to stop outputting the electrical energy, and the lithium-ion battery unit 111 having the silicon anode alone supplies power to the first to-be-powered module 210.

Figure 8:
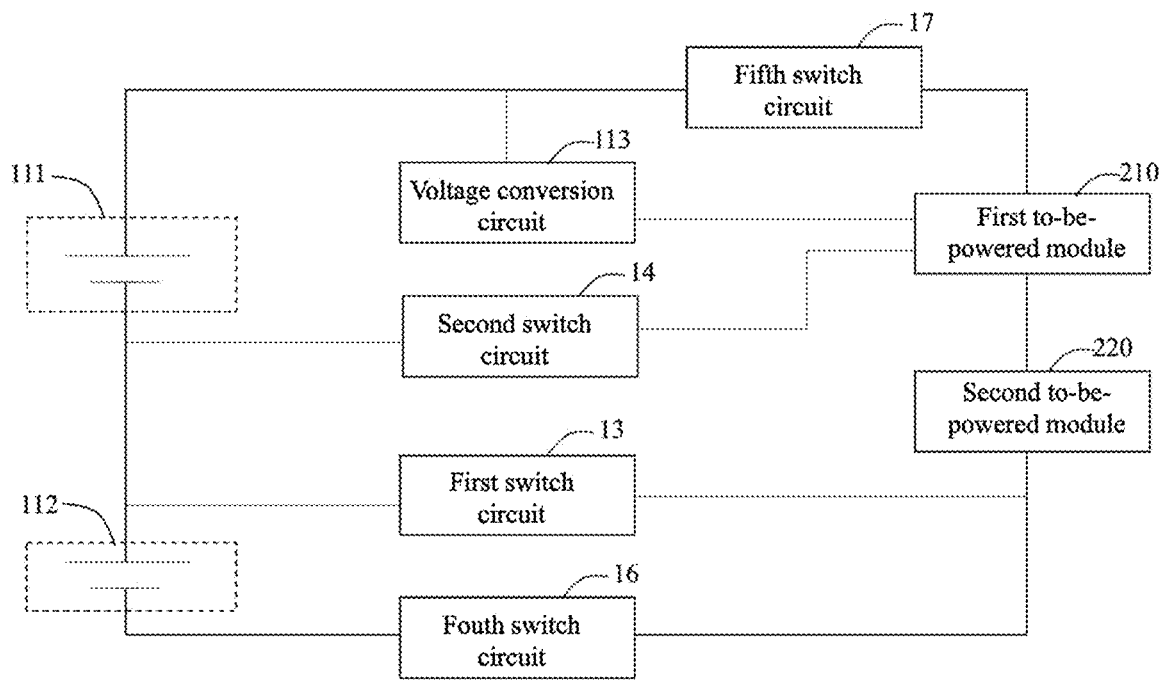
FIG. 8 is a structural diagram of a system of a power supply circuit according to an embodiment of the present disclosure.

In a fifth embodiment, as shown in FIG. 8, the first to-be-powered module 210 and the second to-be-powered module 220 are connected in series. When the supply voltage of the lithium-ion battery unit 112 having the carbon anode is less than or equal to the first threshold voltage, the control circuit 12 controls the lithium-ion battery unit 112 having the carbon anode to stop outputting the electrical energy, and the lithium-ion battery having the silicon anode alone supplies power to the to-be-powered unit 200. When the supply voltage of the lithium-ion battery unit 111 having the silicon anode is less than or equal to the second threshold voltage, the control circuit 12 controls the lithium-ion battery having the silicon anode alone to supply power to the first to-be-powered module 210.

In detail, the power supply circuit 10 includes the control circuit 12, the first switch circuit 13, and the second switch circuit 14. The first switch circuit 13 is connected in parallel with the lithium-ion battery unit 112 having the carbon anode. One end of the second switch circuit 14 is electrically connected to the connection line between the lithium-ion battery unit 112 having the carbon anode and the lithium-ion battery unit 111 having the silicon anode. The other end of the second switch circuit 14 is electrically connected to the first to-be-powered module 210. The control circuit 12 is electrically connected to the first switch circuit 13 and the second switch circuit 14. When the supply voltage of the lithium-ion battery unit 112 having the carbon anode is less than or equal to the first threshold voltage, the control circuit 12 controls the first switch circuit 13 to be conductive, and controls the second switch circuit 14 to be non-conductive, such that the lithium-ion battery unit 112 having the carbon anode stops outputting the electrical energy, and the lithium-ion battery having the silicon anode alone supplies power to the to-be-powered unit 200. When the supply voltage of the lithium-ion battery unit 111 having the silicon anode is less than or equal to the second threshold voltage, the control circuit 12 controls the second switch circuit 14 to be conductive, and controls the first switch circuit 13 to be non-conductive. The control circuit 12 controls the lithium-ion battery having the silicon anode to supply power to the first to-be-powered module 210 alone.

In the present embodiment, the first threshold voltage is 3.4V, the second threshold voltage is 3.2V, and the third threshold voltage is 2.8V. When the lithium-ion battery unit 112 having the carbon anode is less than or equal to 3.4V, the lithium-ion battery unit 111 having the silicon anode is controlled to supply power to the to-be-powered unit 200. When the supply voltage of the lithium-ion battery unit 111 having the silicon anode decreases to 3.2V, the lithium-ion battery unit 111 having the silicon anode is controlled to supply power to the first to-be-powered module 210 only. When the supply voltage of the lithium-ion battery unit 111 having the silicon anode is less than 2.8V, the control circuit 12 controls the lithium-ion battery unit 111 having the silicon anode and the lithium-ion battery having the carbon anode to stop outputting the electrical energy.

As shown in FIG. 7, in the fifth embodiment, the power supply circuit 10 has the voltage conversion circuit 113, i.e., the voltage conversion circuit 113 is further configured in addition to the circuit shown in the fifth embodiment. When the lithium-ion battery unit 111 having the silicon anode alone supplies power to the to-be-powered unit 200 or the first to-be-powered module 210, the voltage conversion circuit 113 is no longer required, and the supply voltage of the lithium-ion battery having the silicon anode supplies power to the to-be-powered unit 200 or the first to-be-powered module 210.

In detail, the power supply circuit 10 includes the first switch circuit 13, the fifth switch circuit 17, and the second switch circuit 14. The first switch circuit 13 is connected in parallel with the lithium-ion battery unit 112 having the carbon anode. One end of the fifth switch circuit 17 is electrically connected to the first end of the voltage conversion circuit 113. The other end of the fifth switch circuit 17 is electrically connected to the second end of the to-be-powered module 200. One end of the second switch circuit 14 is electrically connected to the connection line of the lithium-ion battery unit 112 having the carbon anode and the lithium-ion battery unit 111 having the silicon anode. The other end of the second switch circuit 14 is electrically connected to the first to-be-powered module 210. The control circuit 12 is electrically connected to the first switch circuit 13, the fifth switch circuit 17, and the second switch circuit 14. When the supply voltage of the lithium-ion battery unit 112 having the carbon anode is less than or equal to the first threshold voltage, the control circuit 12 controls the first switch circuit 13 and the fifth switch circuit 17 to be conductive, and controls the second switch circuit 14 to be non-conductive, such that the lithium-ion battery unit 112 having the carbon anode stops outputting the electrical energy, and the lithium-ion battery having the silicon anode alone supplies power to the to-be-powered unit 200.

In more detail, the cathode of the lithium-ion battery unit 112 having the carbon anode is connected to the anode of the lithium-ion battery unit 111 having the silicon anode. The cathode of the lithium-ion battery unit 111 having the silicon anode is connected to the input end of the voltage conversion circuit 113. The output end of the voltage conversion circuit 113 is electrically connected to the electrical input end of the to-be-powered unit 200. The electrical output end of the to-be-powered unit 200 is electrically connected to the anode of the lithium-ion battery having the silicon anode. One end of the first switch circuit 13 is connected to the electrical output end of the to-be-powered unit 200, and the other end of the first switch circuit 13 is connected to the anode of the lithium-ion battery unit 111 having the silicon anode. One end of the fifth switch circuit 17 is connected to the input end of the voltage conversion circuit 113, and the other end of the fifth switch circuit 17 is connected to the electrical input end of the to-be-powered unit 200. One end of the second switch circuit 14 is connected to the electrical output end of the first to-be-powered module 210, and the second end of the second switch circuit 14 is connected to the anode of the lithium-ion battery unit 111 having the silicon anode.

In a sixth embodiment, the first to-be-powered module is connected in parallel with the second to-be-powered module. The power supply circuit 10 further includes the first switch circuit 13 and the second switch circuit 15. The first switch circuit 13 is connected in parallel with the lithium-ion battery unit 112 having the carbon anode. The second switch circuit 15 is connected in series with the second to-be-powered module 220. The control circuit 12 controls the first switch circuit 13 and the second switch circuit 15 to be conductive when the supply voltage of the lithium-ion battery unit 112 having the carbon anode voltage is less than or equal to the first threshold voltage, such that the lithium-ion battery unit 112 having the carbon anode is controlled to stop outputting the electrical energy, and the lithium-ion battery unit 111 having the silicon anode to supply power to the to-be-powered unit alone. When the supply voltage of the lithium-ion battery unit 111 having the silicon anode is less than or equal to the third threshold voltage, the control circuit 12 controls the first switch circuit 13 to be conductive, and controls the second switch circuit 15 to be non-conductive, such that the lithium-ion battery unit 111 having the silicon anode is controlled to supply power to the first to-be-powered module alone.

In the above embodiments, each of the first switch circuit 13, the second switch circuit 14, the third switch circuit 15, the fourth switch circuit 16, and the fifth switch circuit 17 may be a switch tube (such as a MOS tube, a CMOS tube, a triode, and the like). Usage of the switch tube is known to those skilled in the art, and will not be repeatedly described here.

In some embodiments, the power supply circuit 10 further includes a power management chip electrically connected to the to-be-powered unit 200 to manage power of the to-be-powered unit 200. The power management chip has an electrical input end, an electrical input end, and a power supply end. The electrical input end is electrically connected to the power supply battery unit 11 to form a power supply circuit with the power supply battery unit 11. The power supply end is electrically connected to the to-be-powered unit 200. The electrical energy output from the power supply battery unit 11 flows into the to-be-powered unit through the power management chip. The power management chip manages the power of the to-be-powered unit 200. It should be understood that, the power management chip is capable of distributing power and converting voltages. Therefore, configuring the power management chip further improves the power utilization of the lithium-ion battery unit 111 having the silicon anode.

In detail, the power management chip available in the art may be configured to manage the power supply to the to-be-powered unit 200. The control circuit 12 may be electrically connected to the power management chip to control operation of the power management chip. In one embodiment, the control circuit 12 controls the power management chip to supply power to both the first to-be-powered module 210 and the second to-be-powered module 220 when the lithium-ion battery unit 112 having the carbon anode is greater than 3.4V. When the lithium-ion battery unit 112 having the carbon anode is less than or equal to 3.4V, the control circuit 12 controls the power management chip to supply power to the first to-be-powered module 210, and controls the lithium-ion battery unit 111 having the silicon anode to supply power to the first to-be-powered module 210. When the supply voltage of the lithium-ion battery unit 111 having the silicon anode decreases to 2.8V, the control circuit 12 controls the lithium-ion battery unit 111 having the silicon anode to stop outputting voltage.

The present disclosure further provides a charging-discharging circuit 100. The charging-discharging circuit 100 includes a charging circuit and the power supply circuit 10. An input end of the charging circuit is connected to a power source. An output end of the charging circuit is electrically connected to the power supply battery unit 11 to charge the power supply battery unit 11. In detail, the output end of the charging circuit is electrically connected to the lithium-ion battery unit 111 having the silicon anode or the lithium-ion battery unit 112 having the carbon anode, such that the power source, the charging circuit, the lithium-ion battery unit 111 having the silicon anode, and the lithium-ion battery unit 112 having the carbon anode are successively connected end-to-end to form the charging circuit.

In the present embodiment, the input end of the charging circuit is connected to the power source through an adapter 30. The charging circuit includes a direct charging module 21, voltage output from the adapter 30 may be taken as charging voltage to charge the power supply battery unit 11. For example, when two battery packs are configured, one of the two battery packs includes a lithium-ion battery having the silicon anode, which has voltage of 5V, and the other of the two battery packs includes a lithium-ion battery having the carbon anode, which has voltage of 5V, the adapter 30 is capable of outputting voltage of 10V. In this case, the adapter 30 may directly charge the two batteries through a direct charging path. When the adapter 30 is only capable of outputting voltage of 5V, a voltage conversion module 22 is required to increase the output voltage of the adapter 30 to 10V, such that the lithium-ion battery having the silicon anode and the lithium-ion battery having the carbon anode may be charged. Alternatively, the charging circuit includes both the direct charging module 21 and the voltage conversion module 22. It should be noted that the direct charging module 21 and the voltage conversion module 22 available in the art may be configured in the circuit of the present embodiment.

Further, in order to prevent overcharging of the battery with high voltage when the voltage on the lithium-ion battery unit 111 having the silicon anode is unequal to the voltage on the lithium-ion battery unit 112 having the carbon anode, in the present embodiment, the charging-discharging circuit 100 further includes an equalizing circuit 23. The equalizing circuit 23 is connected in parallel between the cathode of the lithium-ion battery unit 111 having the silicon anode and the anode of the lithium-ion battery unit 112 having the carbon anode. The equalization circuit 23 is configured to equalize the voltage on the lithium-ion battery unit 111 having the silicon anode and the voltage on the lithium-ion battery unit 112 having the carbon anode, before or while the charging circuit charges the lithium-ion battery unit 111 having the silicon anode and the lithium-ion battery unit 112 having the carbon anode. The equalization circuit 23 available in the art may be configured in the circuit of the present embodiment.

The present disclosure also provides an intelligent terminal. The intelligent terminal includes the to-be-powered unit 200, the power supply circuit 10 or the charging-discharging circuit 100. The power supply circuit 10 is electrically connected to the to-be-powered unit 200 to supply power to the to-be-powered unit 200. In an embodiment, the intelligent terminal may be a mobile phone. The mobile phone includes a housing, a circuit board disposed inside the housing, and a battery holding space. The battery holding space is defined to receive the lithium-ion battery unit 111 having the silicon anode and the lithium-ion battery unit 112 having the carbon anode.

Although the present disclosure is described with reference to various exemplary embodiments, it should be understood that the terms used are illustrative and exemplary, but not limiting. As the present disclosure can be implemented in various forms without departing from the spirit or essence of the present disclosure, it should be understood that the foregoing embodiments are not limited to any of the foregoing details. The embodiments are to be explained broadly within the spirit and scope of the accompanying claims. Therefore, all variations and adaptations falling within the scope of the claims or their equivalents are to be covered by the accompanying claims.

What is claimed is:

1. A power supply circuit, comprising:
  a power supply battery unit, comprising a lithium-ion battery unit having a silicon anode and a lithium-ion battery unit having a carbon anode, wherein the lithium-ion battery unit having the carbon anode is connected in series with the lithium-ion battery unit having the silicon anode, and the lithium-ion battery unit having the silicon anode and the lithium-ion battery unit having the carbon anode are configured to cooperatively supply power to a to-be-powered unit; and
  a control circuit, wherein;
    the to-be-powered unit comprises a first to-be-powered module and a second to-be-powered module;
    the control circuit controls the lithium-ion battery unit having the carbon anode to stop outputting electrical energy when a supply voltage of the lithium-ion battery unit having the carbon anode is less than or equal to a first threshold voltage, and the lithium-ion battery unit having the silicon anode alone is configured to supply power to the to-be-powered unit; and
    the control circuit controls the lithium-ion battery unit having the silicon anode to supply power to only the first to-be-powered module when supply voltage of the lithium-ion battery unit having the silicon anode is less than or equal to a second threshold voltage.

2. The power supply circuit according to claim 1, wherein the lithium-ion battery unit having the silicon anode comprises:
  one lithium-ion battery having a silicon anode; or
  a plurality of lithium-ion battery units having silicon anodes, the plurality of battery units being successively connected in series.

3. The power supply circuit according to claim 1, wherein the lithium-ion battery unit having the carbon anode comprises:
  one lithium-ion battery having a carbon anode; or
  a plurality of lithium-ion battery units having carbon anodes, the plurality of battery units being successively connected in series.

4. The power supply circuit according to claim 1, wherein the power supply battery unit further comprises a voltage conversion circuit;
  wherein the lithium-ion battery unit having the carbon anode and the lithium-ion battery unit having the silicon anode are connected in series, forming a series battery unit, two ends of the series battery unit are electrically connected to a first end of the voltage conversion circuit and a first end of the to-be-powered unit respectively, a second end of the voltage conversion circuit is electrically connected to a second end of the to-be-powered unit; and
  wherein the voltage conversion circuit is configured for converting voltage of the series battery unit to a voltage required by the to-be-powered unit.

5. The power supply circuit according to claim 1, further comprising a first switch circuit, connected in parallel with the lithium-ion battery unit having the carbon anode;
  wherein the control circuit is electrically connected to the first switch circuit;
  wherein the control circuit controls the first switch circuit to be conductive when the supply voltage of the lithium-ion battery unit having the carbon anode is less than or equal to the first threshold voltage, such that the lithium-ion battery unit having the carbon anode stops outputting the electrical energy, and the lithium-ion battery unit having the silicon anode alone is configured to supply power to the to-be-powered unit.

6. The power supply circuit according to claim 1, wherein:
  the first to-be-powered module is connected in series with the second to-be-powered module, the lithium-ion battery unit having the silicon anode is connected between the first to-be-powered module and the lithium-ion battery unit having the carbon anode;
  the power supply circuit further comprises:
    a first switch circuit, connected in parallel with the lithium-ion battery unit having the carbon anode; and
    a second switch circuit, wherein one end of the second switch circuit is electrically connected to a line between the lithium-ion battery unit having the carbon anode and the lithium-ion battery unit having the silicon anode, and another end of the second switch circuit is electrically connected to a line between the first to-be-powered module and the second to-be-powered module;
  the control circuit controls the first switch circuit to be conductive, and controls the second switch circuit to be non-conductive to control the lithium-ion battery unit having the carbon anode to stop outputting electrical energy when the supply voltage of the lithium-ion battery unit having the carbon anode is less than or equal to the first threshold voltage, and the lithium-ion battery unit having the silicon anode supplies power to the to-be-powered module alone; and
  the control circuit controls the first switch circuit and the second switch circuit to be conductive to control the lithium-ion battery unit having the silicon anode to supply power to the first to-be-powered module alone when the supply voltage of the lithium-ion battery unit having the silicon anode is less than or equal to the second threshold voltage.

7. The power supply circuit according to claim 1, wherein:
  the first to-be-powered module is connected in parallel with the second to-be-powered module;
  the power supply circuit further comprises:
    a first switch circuit, connected in parallel with the lithium-ion battery unit having the carbon anode; and
    a third switch circuit, connected in series with the second to-be-powered module;
  the control circuit controls the first switch circuit and the third switch circuit to be conductive to control the lithium-ion battery unit having the carbon anode to stop outputting electrical energy when the supply voltage of the lithium-ion battery unit having the carbon anode is less than or equal to the first threshold voltage, and the lithium-ion battery unit having the silicon anode supplies power to the to-be-powered unit alone; and
  the control circuit controls the first switch circuit to be conductive and controls the third switch circuit to be non-conductive to control the lithium-ion battery unit having the silicon anode to supply power to the first to-be-powered module alone when the supply voltage of the lithium-ion battery unit having the silicon anode is less than or equal to a third threshold voltage.

8. The power supply circuit according to claim 1, further comprising a power management chip, wherein:
the power management chip has an electrical input end and a power supply end;
the electrical input end is electrically connected to the power supply battery unit to form a power supply circuit with the power supply battery unit;
the power supply end is electrically connected to the to-be-powered unit;
electrical energy output from the power supply battery unit flows into the to-be-powered unit through the power management chip; and
the power management chip is configured to perform power management on the to-be-powered unit.

9. The power supply circuit according to claim 1, wherein:
the to-be-powered unit comprises a first to-be-powered module and a second to-be-powered module;
the power supply circuit further comprises a control circuit;
the control circuit controls the lithium-ion battery unit having the carbon anode to stop outputting electrical energy, controls the lithium-ion battery unit having the silicon anode to supply power to the first to-be-powered module alone, and controls the power supply battery unit to stop supplying power to the second to-be-powered module, when a supply voltage of the lithium-ion battery unit having the carbon anode is less than or equal to a first threshold voltage.

10. The power supply circuit according to claim 9, wherein:
the first to-be-powered module is connected in series with the second to-be-powered module, the lithium-ion battery unit having the silicon anode is connected between the first to-be-powered module and the lithium-ion battery unit having the carbon anode;
the power supply circuit further comprises a second switch circuit, one end of the second switch circuit is electrically connected to a line between the lithium-ion battery unit having the carbon anode and the lithium-ion battery unit having the silicon anode, and another end of the second switch circuit is electrically connected to a line between the first to-be-powered module and the second to-be-powered module; and
the control circuit controls the second switch circuit to be conductive when the supply voltage of the lithium-ion battery unit having the carbon anode is less than or equal to the first threshold voltage, such that the control circuit controls the lithium-ion battery unit having the carbon anode to stop outputting electrical energy, and the lithium-ion battery unit having the silicon anode alone supplies power to the first to-be-powered module.

11. The power supply circuit according to claim 10, further comprising a fourth switch circuit,
wherein the fourth switch circuit is connected in series to a line electrically connected to the to-be-powered unit and the lithium-ion battery unit having the carbon anode;
wherein the control circuit is electrically connected to the fourth switch circuit to control the fourth switch circuit to be non-conductive when the second switch circuit is conductive.

12. The power supply circuit according to claim 9, wherein the first to-be-powered module is connected in parallel with the second to-be-powered module, and the power supply circuit further comprises:
a first switch circuit, connected in parallel with the lithium-ion battery unit having the carbon anode; and
a third switch circuit, connected in series with the second to-be-powered module;
wherein the control circuit controls the first switch circuit to be conductive and controls the third switch circuit to be non-conductive to control the lithium-ion battery unit having the carbon anode to stop outputting electrical energy when the supply voltage of the lithium-ion battery unit having the carbon anode is less than or equal to the first threshold voltage, and the lithium-ion battery unit having the silicon anode alone supplies power to the first to-be-powered module.

13. The power supply circuit according to claim 1, comprising at least one voltage detection circuit, wherein the at least one voltage detection circuit is configured to detect the supply voltage of the lithium-ion battery unit having the carbon anode and/or the supply voltage of the lithium-ion battery unit having the silicon anode.

14. The power supply circuit according to claim 13, further comprising a battery protection plate, and the voltage detection circuit is arranged on the battery protection plate.

15. The power supply circuit according to claim 14, comprising two battery protection plates, wherein one of the two battery protection plates is electrically connected to the lithium-ion battery unit having the silicon anode, and another of the two battery protection plates is electrically connected to the lithium-ion battery unit having the carbon anode.

16. A charging-discharging circuit, comprising a charging circuit and a power supply circuit,
wherein the power supply circuit comprises:
a power supply battery unit, comprising a lithium-ion battery unit having a silicon anode and a lithium-ion battery unit having a carbon anode, wherein the lithium-ion battery unit having the carbon anode is connected in series with the lithium-ion battery unit having the silicon anode, and the lithium-ion battery unit having the silicon anode and the lithium-ion battery unit having the carbon anode are capable of cooperatively supplying power to a to-be-powered unit; and
a control circuit, wherein:
the to-be-powered unit comprises a first to-be-powered module and a second to-be-powered module;
the control circuit controls the lithium-ion battery unit having the carbon anode to stop outputting electrical energy when a supply voltage of the lithium-ion battery unit having the carbon anode is less than or equal to a first threshold voltage, and the lithium-ion battery unit having the silicon anode alone is configured to supply power to the to-be-powered unit; and
the control circuit controls the lithium-ion battery unit having the silicon anode to supply power to only the first to-be-powered module when supply voltage of the lithium-ion battery unit having the silicon anode is less than or equal to a second threshold voltage; and
an input end of the charging circuit is connected to a power source, and the charging circuit is electrically connected to the power supply battery unit to charge the power supply battery unit.

17. The charging-discharging circuit according to claim 16, wherein:
the input end of the charging circuit is connected to the power source through an adapter; and
the charging circuit comprises a direct charging module, the direct charging module is configured to take voltage output from the adapter as charging voltage to charge the power supply battery unit.

18. An intelligent terminal, comprising:

a to-be-powered unit; and a power supply circuit, electrically connected to to-be-powered unit to supply power for the to-be-powered unit, wherein the power supply circuit comprises:

a power supply battery unit, comprising a lithium-ion battery unit having a silicon anode and a lithium-ion battery unit having a carbon anode, wherein the lithium-ion battery unit having the carbon anode is connected in series with the lithium-ion battery unit having the silicon anode, and the lithium-ion battery unit having the silicon anode and the lithium-ion battery unit having the carbon anode are capable of cooperatively supplying power to a to-be-powered unit; and a control circuit, wherein the control circuit controls the lithium-ion battery unit having the carbon anode to stop outputting electrical energy when a supply voltage of the lithium-ion battery unit having the carbon anode is less than or equal to a first threshold voltage, and the lithium-ion battery unit having the silicon anode alone is configured to supply power to the to-be-powered unit;

wherein the to-be-powered unit comprises a first to-be-powered module and a second to-be-powered module, and the control circuit controls the lithium-ion battery unit having the silicon anode to supply power to only the first to-be-powered module when supply voltage of the lithium-ion battery unit having the silicon anode is less than or equal to a second threshold voltage.

* * * * *